US011292625B2

United States Patent
Holka et al.

(10) Patent No.: US 11,292,625 B2
(45) Date of Patent: Apr. 5, 2022

(54) POSITIONING UNIT AND ATTACHMENT UNIT FOR CONTAINER ELEMENT

(71) Applicant: AR Packaging Systems AB, Lund (SE)

(72) Inventors: Simon Holka, Staffanstorp (SE); Per Hagelqvist, Lund (SE)

(73) Assignee: AR Packaging Systems AB

( * ) Notice: Subject to any disclaimer, the term of this patent is extended or adjusted under 35 U.S.C. 154(b) by 312 days.

(21) Appl. No.: 16/615,531

(22) PCT Filed: May 22, 2018

(86) PCT No.: PCT/SE2018/050519
§ 371 (c)(1),
(2) Date: Nov. 21, 2019

(87) PCT Pub. No.: WO2018/217156
PCT Pub. Date: Nov. 29, 2018

(65) Prior Publication Data
US 2020/0180797 A1   Jun. 11, 2020

(30) Foreign Application Priority Data
May 23, 2017 (SE) .................................... 1750636-1

(51) Int. Cl.
*B65B 7/28* (2006.01)
*B29C 65/00* (2006.01)

(52) U.S. Cl.
CPC ...... *B65B 7/2807* (2013.01); *B29C 66/81455* (2013.01); *B29C 66/849* (2013.01); *B65B 7/2878* (2013.01)

(58) Field of Classification Search
CPC ............ B29C 66/849; B29C 66/81455; B65B 7/2807; B65B 7/2878
See application file for complete search history.

(56) References Cited

U.S. PATENT DOCUMENTS

| 4,640,733 A | 2/1987 | Bogren |
| 4,724,654 A | 2/1988 | Dahlin et al. |

(Continued)

FOREIGN PATENT DOCUMENTS

| EP | 0247986 B1 | 2/1990 |
| EP | 1091846 B1 | 3/2008 |

(Continued)

OTHER PUBLICATIONS

International Search Report from Application No. PCT/SE2018/050519 dated Jul. 19, 2018, 5 pages.

(Continued)

*Primary Examiner* — Daniel McNally
(74) *Attorney, Agent, or Firm* — Lerner, David, Littenberg, Krumholz & Mentlik, LLP

(57) ABSTRACT

The present disclosure relates to a positioning unit for positioning a container element in a container body, comprising a base plate of a rigid material, and a plunger skirt of a resiliently deformable material. A footprint surface of the base plate has a circumferential edge with a side edge portion comprising an inwardly curved segment. The plunger skirt is transformable between an unexpanded state and an expanded state by relative movement in relation to the base plate.

The disclosure further relates to an attachment unit for attaching a container element to a container body and to an apparatus for attaching container elements to container bodies in a flow of containers. In addition, the disclosure relates to a method of positioning a container element in a container body by means of the positioning unit.

19 Claims, 11 Drawing Sheets

(56) References Cited

U.S. PATENT DOCUMENTS

| | | | |
|---|---|---|---|
| 4,989,394 A | 2/1991 | Berg et al. | |
| 2012/0241510 A1 | 9/2012 | Clougherty | |
| 2014/0215973 A1* | 8/2014 | Hagelqvist | ............ B65B 7/2878 |
| | | | 53/478 |
| 2014/0287901 A1* | 9/2014 | Hagelqvist | .............. B31B 70/74 |
| | | | 493/108 |
| 2016/0243756 A1 | 8/2016 | Ruegg | |

FOREIGN PATENT DOCUMENTS

| | | |
|---|---|---|
| GN | 105636764 A | 6/2016 |
| JP | S5564007 A | 5/1980 |
| WO | 2013009226 A1 | 1/2013 |

OTHER PUBLICATIONS

International-type Search Report for SE1750636-1 dated Jan. 10, 2018.
Swedish Search Report for SE1750636-1 dated Jan. 10, 2018.
Search Report from 1st Chinese Office Action for Application No. 2018800336593 dated Dec. 17, 2020; 2 pages.

* cited by examiner

POSITIONING UNIT AND ATTACHMENT UNIT FOR CONTAINER ELEMENT

CROSS-REFERENCE TO RELATED APPLICATIONS

The present application is a national phase entry under 35 U.S.C. § 371 of International Application No. PCT/SE2018/050519, filed May 22, 2018, which claims priority from Swedish Patent Application No. 1750636-1, filed May 23, 2017, the disclosures of which are hereby incorporated by reference in their entirety.

TECHNICAL FIELD

The present disclosure relates to a positioning unit for positioning a container element in a container body. The disclosure further relates to an attachment unit for attaching a container element to a container body and to an apparatus for attaching container elements to container bodies in a flow of containers. In addition, the disclosure relates to a method of positioning a container element in a container body by means of the attachment unit.

BACKGROUND

When packaging consumer goods, and in particular when packaging dry flowable consumer goods, it is common to use rigid paperboard packaging containers which serve as protective transport and storage containers at the retail end and as storage and dispensing containers at the consumer end. Such paperboard containers are usually provided with an openable and closable lid.

European patent publication EP 247 986 B1 discloses an expandable type lid welding piston comprising two piston parts; a formation part and an expansion part which are axially movable in relation to each other. The expansion part is operable to provide peripheral expansion of a section of the piston when the two parts are moved together, the expansion part comprising an expansion disc made of a deformable material and the formation part comprising a bottom plate having an upper surface supporting and guiding at least a part of the bottom surface of the expansion disc. The outer peripheral surface of the bottom plate is of the same shape as the outer peripheral edge of the expansion disc. The expansion disc is normally cup-shaped, and the bottom plate has at least the same size as the outer peripheral edge of the expansion disc in its normal, non-expanded condition. The formation and expansion parts are so arranged that axial movement of these parts towards one another results in flattening of the expansion disc from its cup-shape such that the outer peripheral edge thereof extends beyond the periphery of the bottom plate. The lid welding piston may be used as a part in an apparatus for producing packaging containers and serves to introduce and position an inner flexible lid in a container tube and to press an edge portion of the flexible lid against an inner wall of the container tube during a welding operation for attaching the inner flexible lid to the container wall. The lid welding piston is introduced into the container tube with the expansion disc in the non-expanded or normal state. When the flexible lid has been placed at he intended position inside the container tube, the piston parts are moved together, whereby the expansion disc is transformed to the expanded state with the peripheral edge of the expansion disc extending beyond the periphery of the bottom plate, thereby causing the expansion disc to press the edge portion of the flexible lid against the inner wall of the container tube.

US patent publication U.S. Pat. No. 4,989,394 A discloses a device similar to the device in EP 247 986 B1. Hence, U.S. Pat. No. 4,989,394 A discloses radially expansible press plunge comprising two main parts, i.e. a formation part and an expansion part which are movable in relation to each other. The expansion part is arranged to provide an expansion of at least some part of the press plunge when the main parts are moved together. The expansion part comprises a cup formed expansion body and the formation part is designed with a formation surface against which at least parts of the expansion body is adapted to slide when the formation part and the expansion part are moved axially towards each other. The expansion part is composed of two different portions; an outer press portion for executing the actual radially outwards directed contact pressure of the press plunge and consisting of a wear resistant temperature resistant and elastic material; and an inner carrier portion of a relatively hard, elastic material, which carrier portion carries the press portion.

Document WO 2013/009226 A1 discloses an apparatus and method for sealing a cardboard based container. The apparatus comprises: a welding unit configured to fasten a lid to the container, which welding unit comprises an inductive welding energy generator for melting of a weldable layer that forms part of the container and/or the lid; and transporting means configured to transport a flow of containers to and from the welding unit. The transporting means comprises, in a container flow order, a feeding arrangement, a main conveyor member and a movable gripping arrangement, wherein the feeding arrangement, is configured to transfer containers one by one in a continuous manner to the main conveyor member, wherein the movable gripping arrangement is configured to transfer containers from the main conveyor member to the welding unit, and wherein the apparatus is arranged in such a way that, during normal operation of the apparatus, the containers line up close to each other at an upstream side of the feeding arrangement, wherein the feeding arrangement is configured to, during operation, separate adjacent containers from each other in the direction of transport by increasing the feeding speed of each individual container along the feeding arrangement and thereby increasing the distance between adjacent containers fed along the feeding arrangement, wherein the main conveyor member is configured to operate at a transport speed that approximately corresponds to, and is uniform in relation to, a discharge speed of the containers when fed out from the feeding arrangement such that containers transferred to and along the main conveyor member remain separated, wherein the moveable gripping arrangement is configured to grip at least two containers and transfer these containers simultaneously from the main conveyor member to the welding unit, and wherein the welding unit is configured to simultaneously fasten a lid to each of the simultaneously transferred containers. Document WO 2013/009226 A1 also discloses a method for operating an apparatus of this type.

SUMMARY

The object of the present disclosure is to overcome or ameliorate at least one of the disadvantages of the prior art, or to provide a useful alternative.

The object above may be achieved by the subject-matter of claim 1. Embodiments are set forth in the appended dependent claims, in the following description and in the drawings.

Thus, the present invention relates to a positioning unit for positioning a container element in a container body, the positioning unit comprising:

a base plate comprising or consisting of a rigid material, and a resiliently deformable plunger skirt.

The base plate has a footprint surface with a circumferential edge, which circumferential edge comprises a plurality of side edge portions connected by corner portions. The plunger skirt covers a surface of the base plate opposite the footprint surface.

At least one of the side edge portions of the circumferential edge of the base plate comprises a curved segment, which is curved in an inward direction from the circumferential edge of the footprint surface. The plunger skirt is transformable between an unexpanded state and an expanded state. The plunger skirt has an outer circumference, which in the unexpanded state is located at the circumferential edge of the footprint surface of the base plate, and which in the expanded state is located at least partly outside of the circumferential edge of the footprint surface of the base plate.

The outer circumference of the plunger skirt in the unexpanded state preferably has a shape corresponding to a shape of the circumferential edge of the footprint surface with at least one side portion of the outer circumference of the plunger skirt comprising a curved segment, which is curved in an inward direction from the outer circumference of the plunger skirt.

The positioning unit comprises a first piston and a second piston, the first and second pistons extending in an axial direction with the second piston being coaxial with the first piston. The base plate is connected to an end portion of the first piston, such that the footprint surface of the base plate is perpendicular to the axial direction. The plunger skirt is connected to an end portion of the second piston. The first piston and second piston are configured to be axially displaceable in synchrony with each other as well as independently of each other. The end portion of the second piston is configured to be closer to the end portion of the first piston when the plunger skirt is in the expanded state as compared to the unexpanded state.

The term "container element" as used herein comprises an element, which is intended to be attached to the container body in order to form a part of the container. Examples of container elements, for which the transfer plate may be suitably used, are one or more of a bottom disc, a bottom rim, a lid, an upper rim and a sealing disc.

Bottom discs and sealing discs are sheet form components which are applied inside the container body such that they cover a cross-sectional area of the container body. The bottom disc forms a bottom end closure of the container and the sealing disc forms an inner transport seal of the container. The sealing disc is usually placed at the container access opening, sometimes at a distance from the opening edge. The bottom disc and the sealing disc may be made from paper, paperboard, plastic film, aluminium foil and laminates of such materials. Usually, the bottom disc is made from a laminate of a paperboard sheet coated with outer layers of thermoplastic polymeric material and the sealing disc is a flexible component made from a laminate of one or more layers of aluminium foil and outer layers of thermoplastic polymeric material. However, sealing discs made from paperboard web materials are also known in the art. The sealing disc is arranged to be partly or fully removed at an initial opening of the container and may be provided with opening means such as a tear strip, a grip tab, etc. as known in the art.

Upper and lower rims are commonly made from plastic material, such as thermoformable plastic material and take the form of a closed loop, which is applied to the container wall with at least a portion of the rim attached to the inner surface of the container wall. A rim may also cover an end edge of the container wall and extend onto the outer surface of the container wall.

The container may be a packaging container, in particular a paperboard packaging container, intended for containing bulk solids.

As used herein, a "paperboard packaging container" is a packaging container wherein the container body is formed from paperboard web material. The paperboard container may be formed in any manner known in the art, e.g. by forming a container body by bending the paperboard web material into a tubular shape and longitudinally closing the tube by joining overlapping or abutting side edges of the sheet material. The join between the side edges may be covered by a sealing strip.

As used herein, a "paperboard web material" is a material predominantly made from cellulose fibres or paper fibres. The web material may be provided in the form of a continuous web or may be provided as individual sheets of material. The paperboard material may be a single ply or multi ply material and may be a laminate comprising one or more layers of materials such as polymeric films and coatings, metal foil, etc. The polymeric films and coatings may include or consist of thermoplastic polymers. The paperboard material may be coated, printed, embossed, etc. and may comprise fillers, pigments, binders and other additives as known in the art. The paperboard materials as disclosed herein may also be referred to as cardboard or carton materials.

As used herein, the term "bulk solids" refers to a solid bulk material from which a desired amount of the product may be poured, scooped or taken by hand out of a packaging container. The bulk material may be dry or moist. The bulk solids which are suitable for packing in the paperboard packaging containers as disclosed herein include any material in the form of particles, granules, grinds, plant fragments, short fibres, flakes, seeds, pieces, etc.

The paperboard packaging container as disclosed herein may be a container for alimentary products such as infant formula, coffee, tea, rice, flour, sugar, cereals, soup powder, custard powder, pasta, snacks, or the like. Alternatively, the bulk solids may be non-alimentary, such as tobacco, detergent, fertilizer, chemicals or the like.

The container element may be made of paperboard, metal, plastic, or from any suitable combination of such materials as known in the art. Purely as examples: The container element may be of the same material as that of the container body, e.g. if the container element is the bottom disc. Alternatively, the container element may be of plastics, e.g. if the container element is the bottom rim, the upper rim or the lid. The container element may also be of metal, e.g. if the container element is the sealing disc.

A suitable material for the base plate of the positioning unit is a metal, an alloy or a ceramic composite. A suitable material for the plunger skirt of the positioning unit is rubber or plastics. The plunger skirt is reversibly deformable, e.g. to be transformed, when a load is applied to it. Further, the plunger skirt is preferably able to regain its original shape when the load is removed.

The footprint surface of the base plate is configured to face towards the container element in a production process. The footprint surface has a shape and size which is adapted to the shape and size of a container opening. The footprint surface is arranged to face the container opening in a process for producing a packaging container and is utilized when moving the container element into the container body and positioning the container element at a desired location inside the container body. The circumferential edge of the footprint surface may have a generally polygonal shape, such as a generally rectangular shape, with square herein being seen as a special case of a rectangular shape. By a generally polygonal shape as used herein is implied a shape with side edge portions connected by rounded corner portions. A base plate intended for application of container elements into a container body having a generally polygonal cross-sectional shape with rounded corner portions is provided with a footprint surface with a circumferential edge having rounded corner portions to match the rounded corner portions of the container body. As set out herein, the substantially polygonal shape of the circumferential edge of the footprint surface of the base plate deviates from an ideal polygonal shape by the rounded corners and the at least one curved segment, which curves inwards.

The plunger skirt is arranged on top of the base plate, covering an upper surface of the base plate which is opposite the footprint surface. Thereby, when the plunger skirt is in the unexpanded state, it will not be in contact with the container element or will at least not exert any force on the container element, during insertion of the container element to a preselectable desired attachment position inside the container body. When the container element has reached the attachment position, the plunger skirt may be caused to expand in a radial direction thereby pressing an edge portion of the container element circumferentially against an inside of a container wall of the container body. In this expanded state of the plunger skirt, a cross-sectional area delimited by the outer circumference of the plunger skirt is larger than in the unexpanded state of the plunger skirt.

By the provision of at least one curved segment of the circumferential edge of the footprint surface of the base plate and a corresponding at least one curved segment of the outer circumference of the plunger skirt, the risk of the positioning unit contacting the upper edge of the container body and thereby damaging the tubular wall of the container body when inserting the container element may be considerably reduced, or avoided.

In the unexpanded state of the plunger skirt, the outer contour of the plunger skirt preferably corresponds to that of the base plate. Hence, the outer circumference of the plunger skirt preferably has the same or substantially the same shape as the circumferential edge of the footprint surface of the base plate. When seen in relation to the base plate, the outer circumference of the plunger skirt is located at the circumferential edge of the base plate, such as within 3 mm from the circumferential edge of the footprint surface of the base plate, within 2 mm from the circumferential edge of the footprint surface of the base plate or within 1 mm from the circumferential edge of the footprint surface of the base plate. Preferably, the outer circumference of the plunger skirt coincides with the circumferential edge of the footprint surface of the base plate or is located somewhat inside the circumferential edge of the footprint surface of the base plate when the plunger skirt is in the unexpanded state.

During transformation to the expanded state, the plunger skirt will be flattened out and the inwardly curved segments will at the same time straighten out, at least to a degree where the outer circumference of the plunger skirt extends beyond the circumferential edge of the footprint surface. Hence, by carefully selecting the shape of the plunger skirt in the unexpanded state and/or the material properties, a desired change of shape during transformation may be obtained. The material used for the plunger skirt, may be any useful elastically deformable wear and heat resistant material as known in the art, such as natural or synthetic rubber materials, e.g. polyamides, polyurethanes, polyesters, etc.

While not wishing to be bound by theory, it is believed that with the proposed shape of the plunger skirt, the curved segments of the outer circumference of the plunger skirt will move outwards when transforming the plunger skirt to the expanded state, as flattening out of the plunger skirt causes the distance between adjacent corner portions to increase, thereby stretching the outer circumference of the plunger skirt and pulling out the curved segment or segments. Accordingly, the shape of the outer circumference of the plunger skirt is changed such that the inward curvature of the curved segment or segments is reduced or obliterated. As the plunger skirt is made from or comprises an elastically deformable material, the shape-change taking place during the transformation is reversible, implying that the plunger skirt will automatically return to the unexpanded state once the deforming forces causing the transformation to the expanded state are removed.

Preferably, at least two of the plurality of side edge portions of the circumferential edge of the base plate, or more preferably each of the side edge portions of the circumferential edge of the base plate, comprises a respective curved segment.

It may be sufficient to arrange a curved segment at only one side of the circumferential edge of the footprint surface of the base plate and of the outer circumference of the plunger skirt, respectively. When only a single curved segment is employed, it is preferably positioned at a location corresponding to a join in the container body. As mentioned above, the join may result from forming the container body by bending the paperboard web material into a tubular shape and longitudinally closing the tube by joining overlapping or abutting side edges of the sheet material. The join between the side edges may be covered by a sealing strip. The join makes the wall of the container board locally thicker and there is also a risk that it may bend or bulge inwards towards the interior of the container body. Due to the curved segment of the side edge portion of the base plate, the base plate can pass such a potentially inward-bulging join without damaging it when the positioning unit introduces the container element into the container body and moves the container element to the attachment position in the container body.

However, by arranging two side edge portions with a respective curved segment, the positioning unit may be rotated 180 degrees to e.g. even out wear, assuming the shape of the positioning unit is mirror-symmetric. If the positioning unit has a generally square shape, it may be advantageous to arrange four equal side edge portions having a respective curved segment, such that the positioning unit can be rotated by steps of 90 degrees. Moreover, the risk of damaging other portions of the container wall apart from a potential join is considerably reduced or avoided by providing curved segments at more than one side edge portion of the positioning unit. When producing a container having a polygonal or generally polygonal cross-sectional shape, it may be preferred that inwardly curved segments are arranged at all corresponding sides of the positioning unit to avoid or minimise the risk of the positioning unit coming into contact with and potentially damaging any part of the container body edge and the container body wall.

The shape-changing transformation of the plunger skirt may be obtained by the curved segment/s of the side portion/s of the outer circumference of the plunger skirt being less curved in the expanded state of the plunger skirt than in the unexpanded state. Thereby, the curvature of the curved portion is reduced, obliterated or reversed in the expanded state as compared to in the unexpanded state. Preferably, the curved segment is completely straightened out or the curved segment is imparted with a slightly outwardly bulging curvature, such that the inward curvature is obliterated in the expanded state.

Accordingly, a curvature of the curved segment of the side portion of the outer circumference of the plunger skirt may be changed by the elastic transformation of the plunger skirt from the unexpanded state to the expanded state such that the curved segment is less curved in the inward direction in the expanded state of the plunger skirt or is straight in the expanded state of the plunger skirt or is curved in an outward direction away from the outer circumference of the plunger skirt in the expanded state of the plunger skirt.

The inwardly curved segment/s of the side edge portion/s of the circumferential edge of the footprint surface of the base plate may extend all the way from a rounded corner portion to an adjacent rounded corner portion of a substantially polygonal shape. This implies that the whole side edge portion is curved, such that there is no straight segment on the side edge portion. Correspondingly, the curved segment/s of the side portion/s of the circumferential edge of the plunger skirt in the unexpanded state may extend from a rounded corner portion to an adjacent rounded corner portion of the substantially polygonal shape.

In a plunger skirt having an outer circumference with a polygonal shape, a minimum distance $d_e$ from the outer circumference of the plunger skirt to the centre of the polygonal shape of the plunger skirt in the expanded state may be greater than a minimum distance $d_o$ from the outer circumference of the plunger skirt to the centre of the polygonal shape of the plunger skirt in the unexpanded state, preferably at least 1 mm greater, such as at least 2 mm greater, at least 4 mm greater or at least 8 mm.

The base plate has an extension (thickness) in a height direction z being perpendicular to the footprint surface, wherein the extension in the height direction z may be greater at a rounded corner than at an adjacent curved segment of the at least one side edge portion. This is beneficial in order to create an increased pressure in a radial direction at the corner portions of the container body. When applying pressure to the plunger skirt in order to change the shape of the plunger skirt from the unexpanded state to the expanded state, the corner portions of the plunger skirt generally move outwardly a shorter distance than the side portions between the corner portions. By way of example, when the side portions move outwardly in the order of 4 mm, the corner portions may move outwardly only half that distance, i.e. in the order of 2 mm. The provision of thickened corner portions on the upper surface of the base plate, i.e. on the surface of the base plate which is opposite to the footprint surface of the base plate, serves to force the plunger skirt to move further out, thereby exerting an increased pressure on the applied container element and improving contact between the container element and the corner portions of the container body. An enhanced contact pressure may be particularly beneficial at the corner portions of a container body, where wrinkles appearing as a result of folding a peripheral edge portion of a disc shaped container element into alignment with a container wall may cause problems in creating a tight seal between the container element and the container wall.

When inserting a container element to the attachment position in the container body, the first piston and the second piston of the positioning unit are axially displaced in synchrony with each other, i.e. they move together as a single unit. When transforming the plunger skirt to the expanded state, they are displaced independently of each other, such that the second piston is displaced in relation to the first piston in the axial direction. Thereby, the plunger skirt is pressed down on the base plate and is flattened out such that the outer circumference of the plunger skirt is caused to assume the expanded state, thus changing the shape of the plunger skirt under influence of the relative movement of the two pistons. The elastically deformable plunger skirt will automatically return to the unexpanded state once the pressure exerted on it from the first and second pistons is ceased after application of the container element at the desired location inside the container body.

The present invention further relates to an attachment unit for attaching a container element to a container body. The attachment unit comprises a retaining device, adapted to retain the container body, while the container element is being attached to the container body. The attachment unit also comprises a positioning unit as described herein. The retaining device comprises at least one through-going positioning cavity being adapted to receive a portion of the container body. The positioning unit is aligned with the positioning cavity, such that the container element is displaceable by means of the positioning unit into the container body by moving the container element at least partly through the positioning cavity of the retaining device.

The attachment unit may comprise a supporting device, adapted to support the container body and to position the container body in the retaining device. The supporting device may e.g. insert the container body from below into the retaining device and move the container body upwards until it reaches a desired preselected position.

The orientation of the container body depends on which container element is to be attached. Purely as an example: If attaching a lid or an upper rim, the container body is preferably held with an upper opening facing upwards. However, if attaching a bottom disc or a bottom rim, the container body is preferably held with a bottom opening facing upwards. A sealing disc may be attached from either of the two container openings.

The positioning unit is adapted to position the container element in the container body and is vertically aligned with the positioning cavity in the retaining device. The positioning unit may be vertically adjustable and be capable of pressing down the container element into the container body to a desired pre-selected attachment position. Further, as described above, the plunger skirt of the positioning unit may be caused to expand in a radial direction of the positioning cavity. Thereby, an edge portion of the outer circumference of the plunger skirt may be caused to exert pressure on a vertical portion of the container element, such as a folded edge portion of a bottom disc, circumferentially in a direction towards a wall of the positioning cavity. In this manner, the outer circumference of the plunger skirt will press against an inside of a container wall of the container body which is placed in the positioning cavity. The edge portion of the outer circumference of the plunger skirt which in the expanded state of the plunger skirt is arranged to be in contact with and exert pressure on the container element, may have a contact surface which in the non-expanded state of the plunger skirt is slightly tilted with respect to the vertical direction of the positioning unit.

The retaining device may comprise a lining located in the positioning cavity and being arranged to shield an exposed edge of a container body. The lining is preferably applied such that it encircles the positioning cavity, thereby locally reducing a cross-sectional area of the positioning cavity. The lining may have a thickness in the same order as a thickness of a sheet material used for the container body and may be in the range of from 0.2 to 2 mm, such as from 0.5 to 1.5 mm or from 0.6 to 0.9 mm. This will e.g. be helpful when folding an edge portion of a sealing disc or a bottom disc.

The retaining device may comprise a welding unit, preferably arranged around the positioning cavity. The welding unit is adapted to weld the container element to the container body, e.g. the welding unit comprising a coil extending around the positioning cavity. Any suitable welding technique may be used, such as ultrasonic welding or high frequency welding, with high frequency welding being preferred. If the positioning unit may be caused to expand in a radial direction of the positioning cavity, as described above, the container element can be pressed against the welding unit.

As an alternative or a complement to welding, an adhesive may be applied to the container element before attaching it to the container body. However, this requires a further component to be added to the container as well as additional equipment for supplying and applying the adhesive.

The attachment unit may further comprise a transfer plate for transferring the container element between a first position and a second position. The transfer plate comprises at least one through-going transfer cavity adapted to receive and hold the container element. The transfer plate is displaceable between the first position, in which the transfer plate is adapted to receive the container element in the transfer cavity, and the second position in which the transfer cavity is aligned with the positioning cavity of the retaining device, the transfer plate in the second position being located between the positioning unit and the positioning cavity of the retaining device, such that the container element is displaceable by means of the positioning unit from the transfer cavity in the transfer plate into the container body by moving the container element through the transfer cavity and at least partly through the positioning cavity of the retaining device. There may also be additional positions, e.g. intermediate positions in between.

The through-going transfer cavity of the transfer plate may have a smaller cross-sectional area than the positioning cavity of the retaining device. The difference may correspond to the thickness of the container wall, which typically is in the range of from 0.2 to 2 mm, such as from 0.5 to 1.5 mm, or from 0.6 to 0.9 mm. This will e.g. be helpful when folding an edge portion of the inserted container element and may be used as an alternative or a complement to the above-mentioned lining.

The transfer plate may comprise one or more holding elements adapted to hold the container element in the transfer cavity. The one or more holding elements may be located at a wall of the transfer cavity, preferably at a centre of a side of the wall. One, two, three, four or more holding elements may be provided. There may e.g. be four such holding elements adapted to hold each of the sides of the container element for the case that the container has a substantially rectangular or square shape. The holding elements are then preferably located at a centre of each side of the substantially rectangular or square transfer cavity wall. The holding elements may be resilient, e.g. due to material properties or by being biased by a spring. As an alternative, or a complement, the container element itself may be resilient, e.g. due to material properties. The holding elements may be utilized to compensate for tolerances regarding the dimensions of the container element and/or the transfer cavity. In addition, or as a complement, the holding elements may be used to temporarily press the sides of the container element, e.g. the bottom rim, inwards, such that the container element will be easier to insert into the container body, thereby lowering or avoiding the risk of damaging the edges of the container body during insertion of the container element.

If the above-described holding elements are used in the transfer plate, the expansible plunger skirt may contribute to returning an inwardly pressed container element to its original shape in case the container element lacks sufficient resiliency to regain the original shape without outer influence.

In order to facilitate placing the container element into the transfer cavity, there may be one or more indentations arranged around the transfer cavity intended to allow space for one or more gripping members which are used to place the container element in the transfer cavity. The indentations do not form holes going all the way through the transfer plate.

If holding elements are provided in the transfer plate as described herein, the indentations are preferably located so as not to interfere with the holding elements. Thus, the indentations may be located in the corners of the transfer cavity. Such gripping members and corresponding indentations being arranged at the periphery of the transfer cavity are particularly useful for loop-shaped container elements, which comprise an inner volume filled by gas, e.g. air, such as a top rim or a bottom rim.

If the container element is a sheet shaped container element, such as a bottom disc, a lid or a sealing disc, the container element may instead be placed into the transfer cavity by means of e.g. a suction cup.

The retaining device may comprise a plurality of positioning cavities and the attachment unit may comprise a plurality of positioning units as described herein aligned with the positioning cavities, such that each positioning unit is associated with a respective positioning cavity, the positioning cavities and the positioning units preferably being arranged in a row. The plurality may be two, three, four, six, eight, ten or more positioning cavities and/or positioning units.

Moreover, the optional transfer plate may comprise a plurality of cavity portions, each cavity portion comprising a respective transfer cavity and being arranged together with a corresponding cover portion. The retaining device may then comprise a corresponding plurality of positioning cavities. An optional supporting device may be adapted to support a corresponding plurality of container bodies and to position the container bodies in the positioning cavities of the retaining device.

The plurality of positioning units may be adapted to simultaneously position the plurality of container elements in the respective container bodies. It has been found suitable to attach a plurality of container elements to a respective container body at the same time, in order to increase the running speed of the apparatus. Purely as examples, two, three, four, six, eight, ten or more container elements may be attached at the same time.

The present invention further relates to an apparatus for attaching container elements to container bodies in a flow of containers. The apparatus comprises a transport means configured to transport the flow of containers through the apparatus and at least one attachment unit as described herein arranged along the transport means.

The transport means may comprise one or more conveyor members, a feeding arrangement, e.g. in the form of two feed screw members at respective opposite sides of the container body, and/or one or more movable gripping arrangements. The components of the transport means may be similar to those described in the above-mentioned published patent application WO 2013/009226 A1, to which document reference is made for further details. The transport means are arranged to transport the container bodies to and from the attachment unit.

The apparatus may comprise a several attachment units as described herein arranged at different locations along the transport means and being configured for attaching different container elements to the container body. A first attachment unit may be arranged to attach a disc shaped element, e.g. a bottom disc or an inner sealing disc, to the container bodies, and a second attachment unit as described herein may be arranged to attach a reinforcing rim, e.g. a bottom rim or a top rim, to the container bodies, the second attachment unit being located downstream of the first attachment unit. The transport means is adapted to transport the container bodies to the first attachment unit, between the attachment units and/or from the second attachment unit and onwards.

The apparatus may comprise further attachment units as described herein. There may e.g. be attachment units for one or more of the container elements mentioned herein, i.e. the bottom disc, the bottom rim, the lid, the upper rim or the sealing disc. Further, a single attachment unit may be utilized for attaching more than one container element.

The apparatus may comprise an external housing arranged to enclose the transport means and the at least one attachment unit. The external housing may be used to protect the apparatus from interference from the outside. The external housing may be adapted to provide and maintain a protective gas atmosphere. The protective gas may be nitrogen, carbon dioxide or a mixture of nitrogen and carbon dioxide. It is preferable that the external housing forms a gas chamber, which is as closed as possible in order to minimize losses of the protective gas and/or to minimize entrance of surrounding air.

The attachment unit may optionally comprise an internal housing located within the external housing and being arranged to provide an additional protective gas atmosphere above the positioning cavity of the retaining device. The external housing and the internal housing may together function as a two-step protective enclosure around the transport means and the at least one attachment unit to ascertain that attaching of the container element may be performed in a protective gas atmosphere with a minimum of loss of protective gas.

The present invention also relates to a method of positioning a container element in a container body by means of a positioning unit as described herein. The method comprises:
  moving the container element to a preselectable position in the container body by means of the positioning unit
    inserting the container element into the container body, the plunger skirt thereby being in the unexpanded state,
  when the container element reaches the preselectable position, transforming the plunger skirt to the expanded state, thereby pressing an edge portion of the container element in a direction towards an inner wall of the container body.

As described above, the step of transforming the plunger skirt to the expanded state may be performed by means of relative displacement between the first piston and the second piston, wherein the end portion of the second piston is moved closer to the end portion of the first piston. When the outer ends of the first and the second pistons are brought together, the end portion of the second piston to which the plunger skirt is attached is moved towards the base plate and exerts pressure on the plunger skirt which is located between the end portion of the second piston and the base plate. The pressure on the resiliently deformable plunger skirt causes the plunger skirt to flatten out so that the dimension of the plunger skirt diminishes in the axial direction of the positioning unit at the same time as the outer circumference of the plunger skirt expands outwardly in the radial direction of the positioning unit by sliding on the surface of the base plate which is opposite the footprint surface. Accordingly, the shape of the plunger skirt changes under the influence of the compressive force acting in the axial direction between the end portion of the second piston and the base plate at the end portion of the first piston.

The method may further comprise
  fixing the container element to the container body, e.g. by means of welding and/or an adhesive
  If the attachment unit comprises a transfer plate as described herein, the method may comprise
    placing the container element in the transfer cavity,
    displacing the transfer plate to the second position,
    displacing the container element from the transfer cavity in the transfer plate into the container body by means of the positioning unit by moving through the transfer cavity and at least partly through the positioning cavity of the retaining device.
  If the attachment unit comprises a plurality of positioning units, the method may comprise that a plurality of container elements are simultaneously positioned into said respective container bodies by said positioning units.

BRIEF DESCRIPTION OF THE DRAWINGS

The present invention will hereinafter be further explained by means of non-limiting examples with reference to the appended drawings wherein.

It should be noted that the appended drawings are schematic and that individual components are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, as defined by the appended claims. Details from two or more of the embodiments may be combined with each other.

Figure 1:
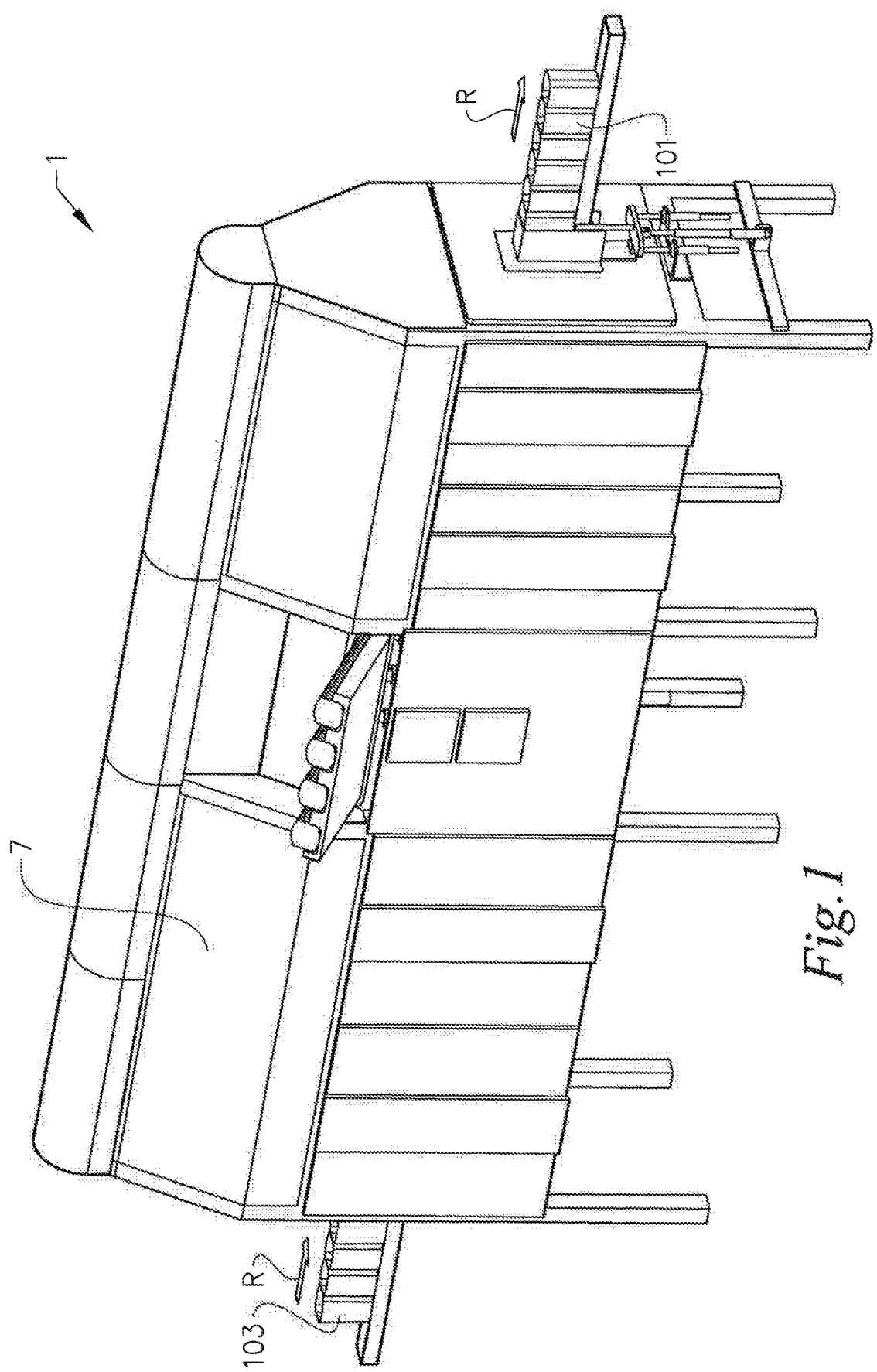
FIG. 1 shows an apparatus according to the invention for attaching container elements to container bodies in a flow of containers in a perspective view.
Figure 2:
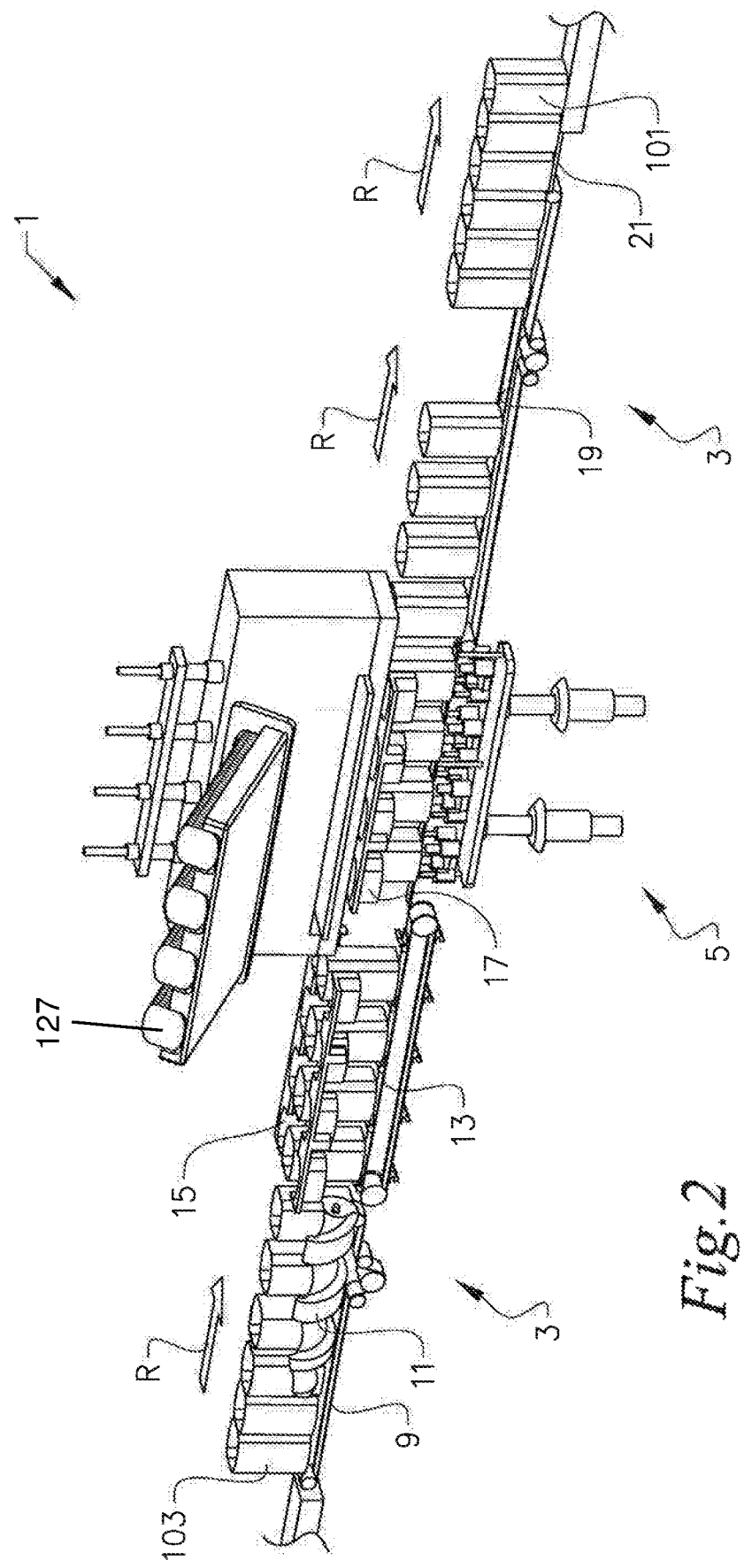
FIG. 2 shows an inside of the apparatus of FIG. 1.
Figure 3:
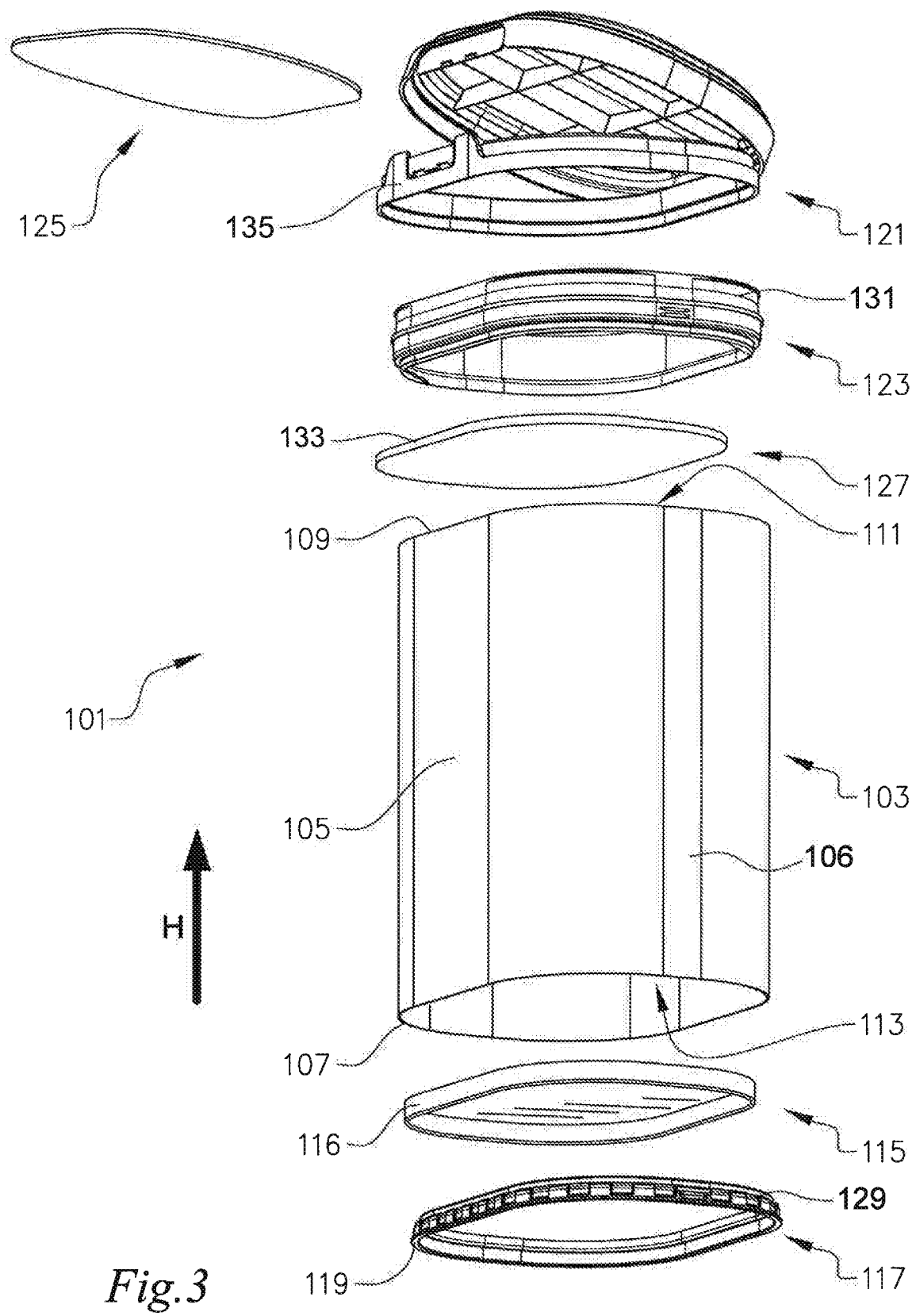
FIG. 3 shows an exemplary container, for which the apparatus is suitable.

FIGS. 1 and 2 illustrate an apparatus 1 according to the invention for attaching container elements to container bodies in a flow of containers. FIG. 3 shows an exemplary container 101, for which the apparatus 1 is suitable.

The apparatus 1 comprises a transport means 3 configured to transport the flow of containers through the apparatus 1 and an attachment unit 5 for attaching a container element to a container body. An external housing 7 is arranged to enclose the transport means 3 and the attachment unit 5. FIG. 1 shows a perspective view of the apparatus 1.

FIG. 2 shows an inside of the apparatus 1 with the external housing 7 removed for better visibility.

The apparatus 1 is suitably used for producing paperboard packaging containers 101 for pourable or scoopable bulk solids, like the one illustrated in FIG. 3. The particular shape of the container 101 shown in the figures should not be considered limiting to the invention, since the apparatus 1 is suitable for containers of any useful shape or size. It is also to be understood that the container elements shown in connection with the container 101 in FIG. 3 are not limiting to the invention. Accordingly, the positioning unit, the attachment unit, the apparatus and the method of positioning a container element as disclosed herein is applicable in the production of containers having fewer or more container elements as compared to the container 101 shown in FIG. 3. Furthermore, the container elements may have different sizes, shapes and functional features from those shown in FIG. 3. By way of example, an upper rim may be provided with a scoop holder, and/or a scraper bar. The closure mechanism on the lid may be different from that disclosed in connection with FIG. 3, etc.

The container 101 comprises a container body 103 formed by a tubular container wall 105. The container wall 105 extends in a height direction H of the container 101 from a bottom end edge 107 at a bottom end of the container body 103 to an upper end edge 109 at an upper end of the container body 103. The container body 103 has an upper opening 111 at the upper end and a bottom opening 113 at the bottom end. A bottom disc 115 is positioned at the bottom end of the container body 103 and covers the bottom opening 113. The container body 103 is made from paperboard material as defined herein. The container body 103 may be formed by bringing together the side edges of a paperboard web of causing the material to assume a tubular shape, whereafter the side edges are sealed together. Sealing of the side edges may be made by any suitable method as known in the art, such as by welding or gluing, with welding, such as induction welding, being preferred. Sealing of the side edges of the container body web may involve using a sealing strip which is applied over the join between the side edges, as known in the art. The bottom disc 115 may be made from paperboard, metal, plastic, or from any suitable combination of such materials as known in the art. The bottom disc 115 may have a folded edge portion 116 forming a wall which serves to attach the bottom disc 115 to the inner surface of the container wall 105.

The bottom end edge 107 is reinforced by a reinforcing bottom rim 117 which is applied to the inner surface of the container wall 105 and/or to the folded edge portion 116 of the bottom disc 115, between the bottom disc 115 and the bottom end edge 107. In the illustrated embodiment, the bottom rim 117 has an outwardly directed flange 119 which covers the bottom end edge 107 and forms a bottom edge of the container 101. The bottom rim 117 reinforces the bottom end edge 107, stabilizes the shape of the container body 103 and protects the bottom edge 107 from mechanical deformation. The bottom rim 117 also serves as a protective barrier against water and other fluids which may be present on a surface on which the container 101 is placed. The bottom rim 117 delimits a downwardly open space between the bottom disc 115 and the bottom edge of the container 101, which may be used to accommodate stacking elements arranged at an upper end of another container when stacking two or more containers on top of each other. The reinforcing bottom rim is an optional component of the packaging container as disclosed herein.

As an alternative to the illustrated bottom rim 117, the bottom edge of the container may be formed by a rolled edge of the container body 103, or may be provided by a simple, non-rolled join between the bottom disc 115 and the container body 103.

The container 101 is provided with a closure arrangement comprising a lid 121 and a reinforcing upper rim 123 extending along the container opening edge 109. The lid 121 comprises a planar disc 125. The exemplary container 101 is further provided with a fully or partly removable sealing disc 127 which is adapted to be sealed to the container body wall 105.

The bottom disc 115, the bottom rim 117, the lid 121, the upper rim 123 and the sealing disc 127 are examples of container elements for which the apparatus 1 is suitably used to attach the container element to the container body 103.

The bottom rim 117 and the upper rim 123 are typically made of plastic material, preferably thermoplastic material. As may be gleaned from FIG. 3, the bottom rim 117 and the upper rim 123 form closed loops with a main extension in a loop plane. The closed loop encloses an open space in the centre. The bottom rim 117 and the upper rim 123 also have a respective extension in the height direction H of the container 101 forming a respective edge portion 129, 131 of the container element. Thereby, the closed loop defines an inner volume of the bottom rim 117 and the upper rim 123, respectively.

The bottom disc 115, the lid 121 and the sealing disc 127 are adapted to extend over the cross-section of the container body 103 and to form a cross-sectional seal or closure. An edge portion 133 of the sealing disc 127 is folded upwards or downwards, such that it is brought to conform to an inside of the container wall 105 and is attached to the inside of the container wall 105. Likewise, the bottom disc 115 and the lid 121 each have a folded edge portion 116, 135 extending in the height direction H of the container 101. An inner volume of the container 101 is defined between the bottom disc 115 and the lid 121. The sealing disc 127 forms a transport seal at the upper end of the container 101 and an inner transport volume is defined between the sealing disc 127 and the bottom disc 115. The sealing disc 127 is adapted to be fully or partly removed by a user of the container 101 in order to gain a first access to the packaged contents in the container 101.

Going back again to FIGS. 1 and 2, it can be seen that a conveyor feeds container bodies 103 to the apparatus 1. Another conveyor feeds containers 101 away from the apparatus 1. In the exemplary illustrated embodiment of the apparatus 1, it is assumed that the material to be contained in the container 101 has been filled into the interior of the container body 103 in a filling unit located upstream of the apparatus 1.

FIG. 2 shows of the inside of the apparatus 1. Following a running direction R of the apparatus 1, the transport means 3 comprises an inlet conveyor member 9, a feeding arrangement 11 in the form of two feed screw members arranged at respective opposite sides of the container body 103, whereof one of the feed screw members can be seen in FIG. 2, a main conveyor member 13, a first movable gripping arrangement 15, a second movable gripping arrangement 17, an outlet conveyor member 19 arranged downstream of the attachment unit 5 and a stationary sliding plate 21 arranged at the outlet of the apparatus 1. The components 9, 11, 13, 15, 17, 19, 21 of the transport means 3 constitute examples and are similar to those described in WO 2013/009226 A1, to which document reference is made for further details.

The attachment unit 5 is located between the main conveyor member 13 and the outlet conveyor member 19 as seen in the running direction R of the apparatus 1. The attachment unit 5 is further described below in conjunction with FIGS. 4 and 5. The first movable gripping arrangement 15 and the second movable gripping arrangement 17 move the container bodies 103 to and from the attachment unit 5. In the embodiment illustrated in FIGS. 1 and 2, the attachment unit 5 is adapted to attach transport seals in the form of sealing discs 127 inside the container bodies 103. It has been found suitable to simultaneously attach a plurality of sealing discs 127 to a plurality of corresponding container bodies 103, in order to increase the running speed of the apparatus 1. In the illustrated embodiment, four sealing discs 127 are attached at the same time to respective container bodies 103. Alternatively, the sealing discs 127 may be attached in groups of any other number than four, e.g. two, three, six, eight or ten, at the same time, or may be sequentially attached to the containers.

As set out herein, the apparatus 1 may comprise one or more additional attachment unit(s), being adapted to attach other container elements to the container body 103. Any such additional attachment unit would be located upstream or downstream of the illustrated attachment unit 5. Similar to the illustrated attachment unit 5, the additional attachment unit(s) are preferably arranged to attach container elements to a plurality of container bodies 103 at the same time, preferably for the same number of container bodies 103 as for the illustrated attachment unit 5.

The external housing 7 encloses the transport means 3 and the at least one attachment unit 5. The external housing 7 is adapted to protect the apparatus 1 and/or to provide and maintain a protective gas atmosphere inside the apparatus 1. The protective gas may be nitrogen, carbon dioxide or a mixture of nitrogen and carbon dioxide. It is therefore preferred that the external housing 7 forms a gas chamber, which is as closed as possible in order to minimize losses of the protective gas and/or to minimize entrance of the surrounding air into the chamber formed by the external housing 7. However, the external housing 7 may be open downwards.

As an option, degassing of the container may be performed when filling material such as bulk solids into the container. The degassing may comprise supplying a protective gas to the flow of material to be contained in the container during filling. The protective gas may be nitrogen, carbon dioxide or a mixture of nitrogen and carbon dioxide. The protective gas may be blown into the flow of material before the material reaches the container. If the material is treated with protective gas during filling, the containers are preferably conveyed to the apparatus 1, while maintaining the protective atmosphere, e.g. by moving the containers through a tunnel filled with protective gas. Alternatively, the filled containers may be introduced in a vacuum chamber to draw off air, whereafter the containers are subjected to a protective gas atmosphere and closed.

Even if it is assumed in the illustrated embodiment that the material to be contained in the container has been filled in the container upstream of the apparatus 1, it would also be possible to locate the filling unit inside the external housing 7 of the apparatus. The external housing could in that case enclose the filling unit and/or one or more units for attaching the sealing disc 127, the upper rim 123 and the lid 121.

Figure 4:
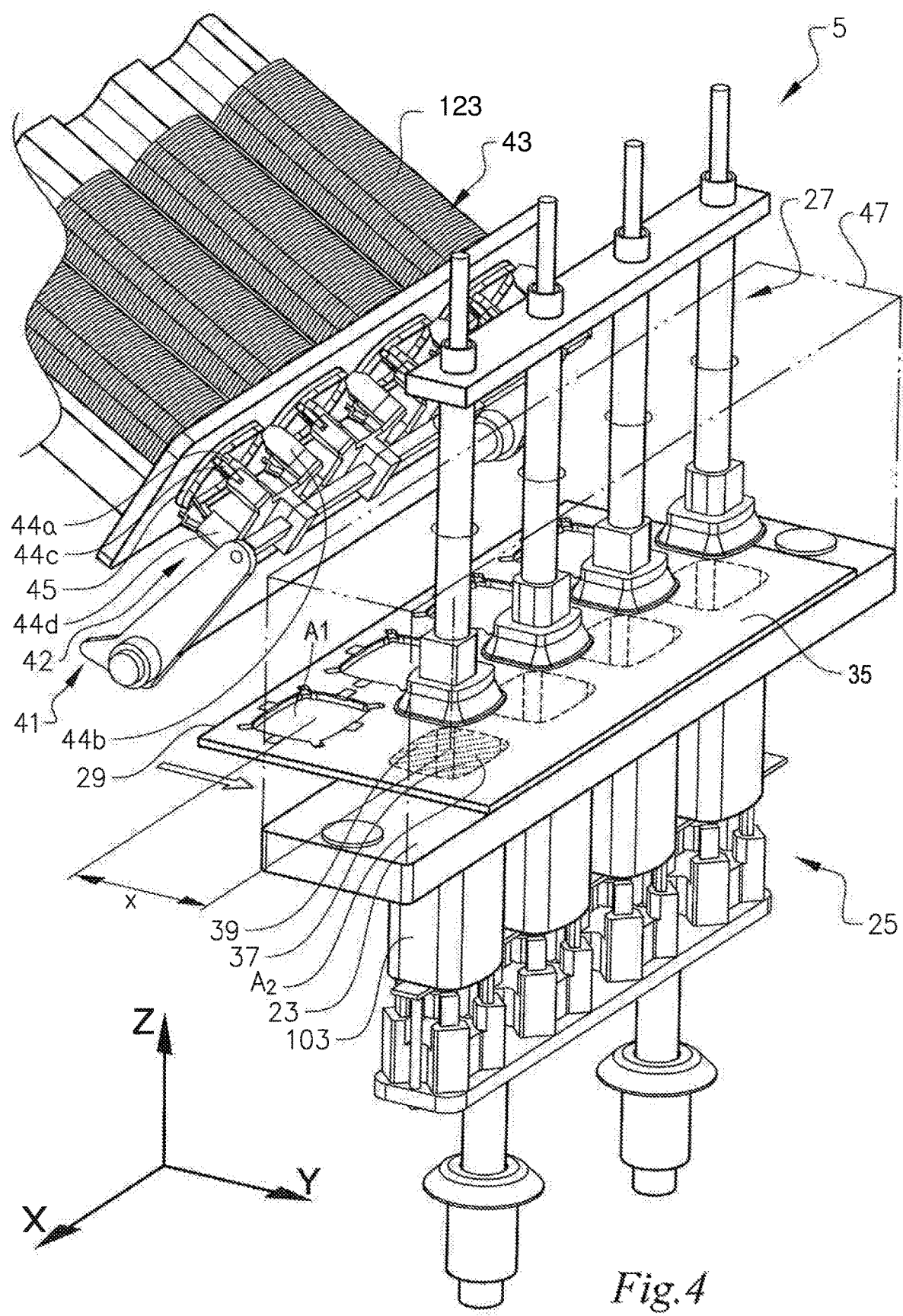
FIG. 4 shows an attachment unit for attaching a container element according to the invention with a transfer plate in a first position.
Figure 5:
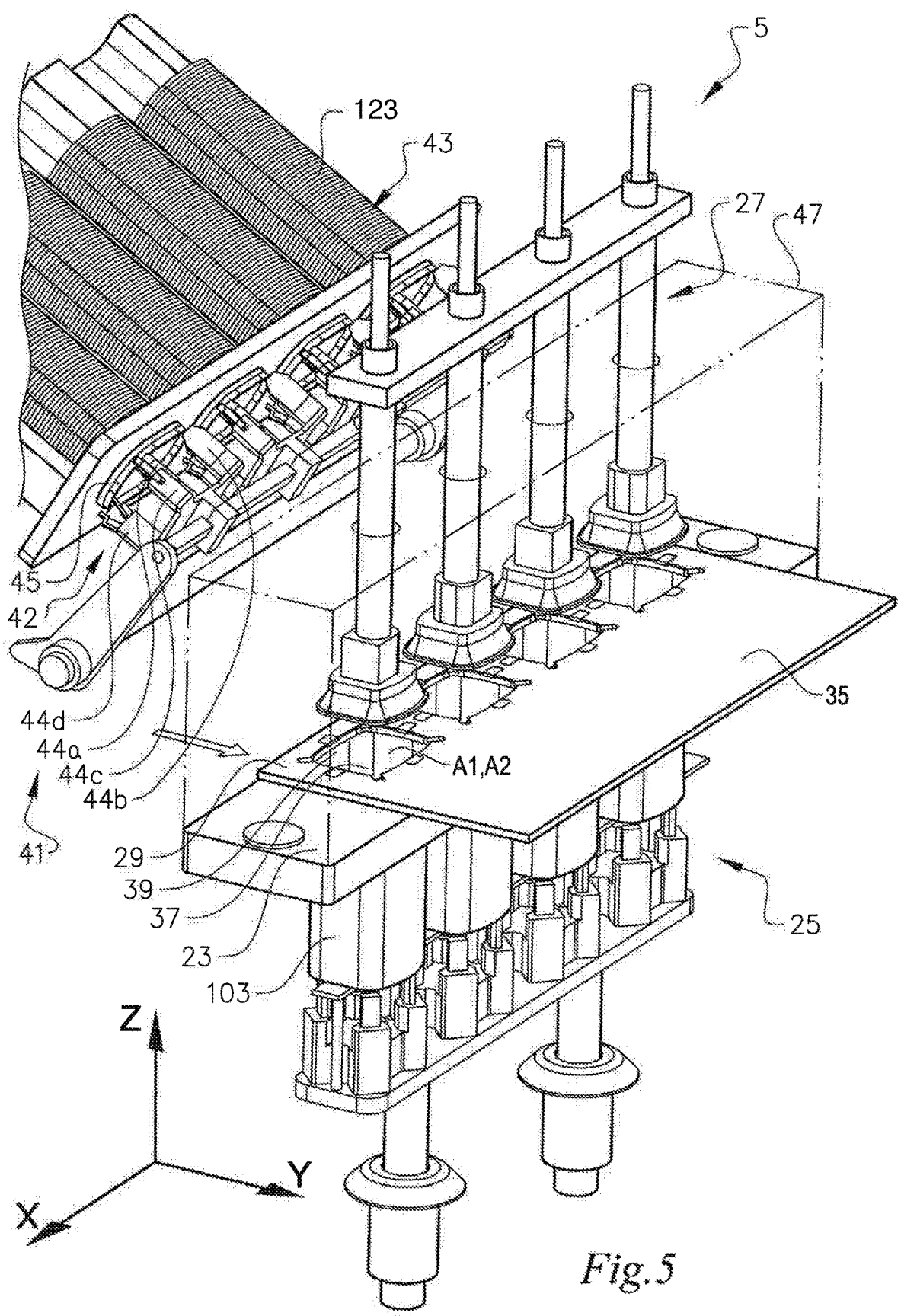
FIG. 5 shows the attachment unit of FIG. 4 with the transfer plate in a second position.

FIGS. 4 and 5 illustrate an attachment unit 5 for attaching a container element according to the invention. The illustrated embodiment shows attachment of the upper rim 123. However, such an attachment unit 5 would also be suitable for attachment of any of the other container elements mentioned herein, i.e. the sealing disc 127, the bottom disc 115, the bottom rim 117 or the lid 121. The attachment unit 5 comprises a retaining device 23, a supporting device 25, a positioning unit 27 and a transfer plate 29.

Figure 6:
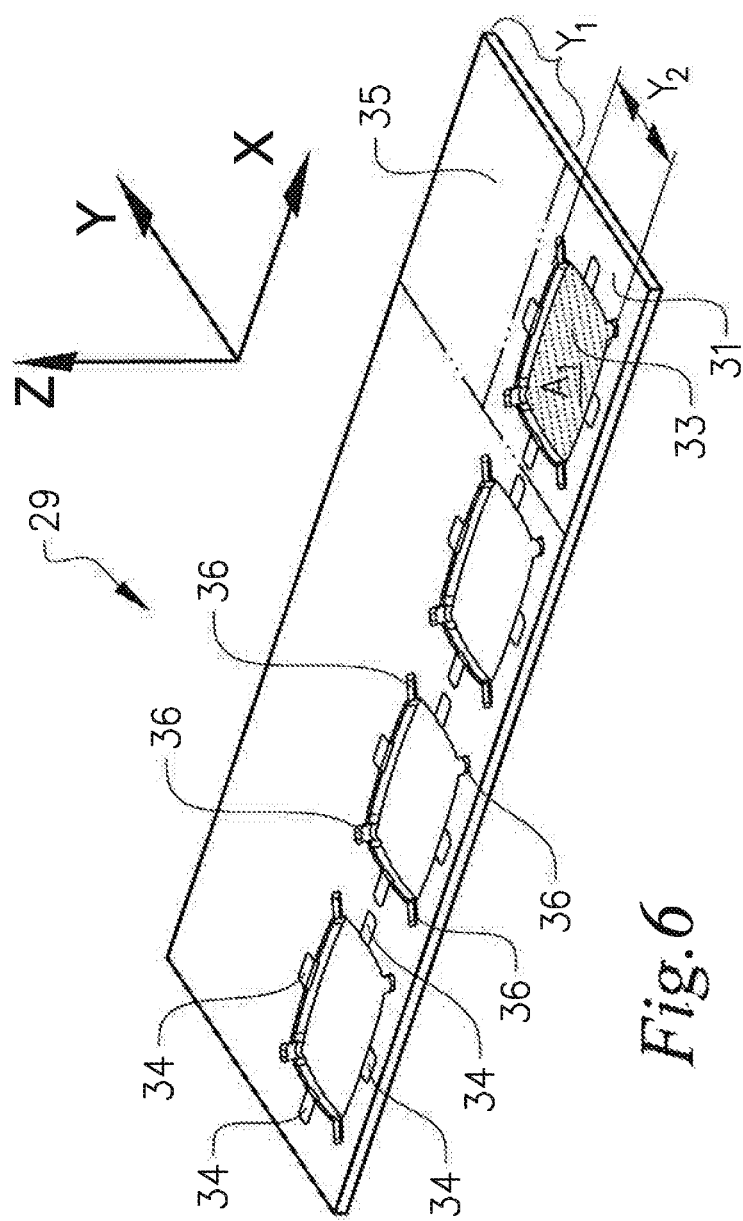
FIG. 6 shows the transfer plate.

An example of a transfer plate 29 is illustrated in FIG. 6. The transfer plate 29 extends in a first direction x, parallel to the running direction R of the apparatus 1, and a second direction perpendicular to first direction x and coinciding with the transverse direction of the apparatus 1. The transfer plate 29 comprises a cavity portion 31 with at least one through-going transfer cavity 33 which is adapted to receive and hold the container element, in this case an upper rim 123 or a bottom rim 117. The transfer cavity 33 has a first open area $A_1$ and is configured to retain the container element.

As an alternative, the transfer plate 29 may be omitted such that the container element, e.g. a sealing disc 127 is placed directly on top of the retaining device 23.

In order to minimize or preferably avoid unnecessary loss of protective gas, the shape of the transfer cavity 33 is made to correspond to the shape of the container element, e.g. an upper rim 123 or a bottom rim 117. In case the container element includes an edge portion which is to be folded when the container element inserted in the container, as is the case in a bottom disc 115 or a sealing disc 127, the first open area $A_1$ of the transfer cavity 33 may be smaller than the surface area of the container element before folding, wherein the area difference corresponds to the area of the portion of the container element which forms the folded edge portion. Such a folded edge portion is typically band shaped and may have a width in the range of from 1 to 10 mm, preferably in the range of from 2 to 5 mm. Accordingly, a folded edge portion on a sheet form container element such as a sealing disc or a bottom disc may be created by pressing the container element down through a transfer cavity having a smaller cross-sectional area than the container element, thereby forcing the sheet form container element to fold at the edge of the transfer cavity in order to be accommodated within the first open area $A_1$ of the transfer cavity.

A wall of the transfer cavity 33 may comprise holding elements 34 adapted to hold the container element in the transfer cavity 33. See FIG. 6. Such holding elements 34 are especially useful for a container element such as a rim which does not have a disc shape, but instead forms a loop, which comprises an inner volume filled by gas, e.g. air, such as the bottom rim 117 or the upper rim 123. For disc shaped container elements, such as the bottom disc 115, the lid 121 or the sealing disc 127, the holding elements 34 may be omitted.

In the illustrated embodiment, there are four such holding elements 34 adapted to hold each of the sides of the container element, which in the illustrated embodiment is substantially rectangular or square, preferably at a centre of each side. It would be feasible to use one, two, three, four or more such holding elements 34. The holding elements 34 may be resilient, e.g. due to material properties or by being biased by a spring. As an alternative, or a complement, the container element such as a rim may itself be resilient, e.g. due to material properties. The holding elements 34 may be utilized to compensate for tolerances regarding the dimensions of the container element 115, 117, 121, 123, 127 and/or the transfer cavity 33. In addition, or as a complement, the holding elements 34 may be used to temporarily press the sides of the container element, e.g. the bottom rim 117, inwards, such that the container element will be easier to insert into the container body 103, thereby lowering or avoiding the risk of damaging the edges of the container body 103 during insertion of the bottom rim 117.

As illustrated in FIGS. 4, 5 and 6, the transfer plate 29 may optionally comprise a cover portion 35 which is at least as large as, or substantially as large as, the first open area $A_1$ of the transfer cavity 33. The cover portion 35 is arranged adjacent to the cavity portion 31 as seen in the second direction y. The cover portion 35 has a minimum extension $y_1$ in the second direction y, which is at least 1.0 times a maximum extension $y_2$ in the second direction y of the area $A_1$ of the transfer cavity 33, preferably at least 1.2 times, more preferably at least 1.4 times. The use of a cover portion 35 is advantageous when the container element is in the form of a loop, i.e. when the container element is not in the form of a disc, which after application inside the container body would form a seal over the container opening and prevent gas from escaping out through the container body.

In order to facilitate placing the container element 115, 117, 121, 123, 127 into the transfer cavity 33 of the transfer plate 29, indentations 36 may be provided as illustrated in FIG. 6. The indentations 36 allow space for gripping members 44a, 44b, 44c, 44d which are arranged to move the container element into the transfer cavity 33. See FIGS. 4 and 5 and the further description of the gripping members below. If utilizing holding elements 34, the indentations 36 are preferably located such that they do not interfere with the holding elements 34. Thus, the indentations 36 may be located in the corners of the transfer cavity 33. Such gripping members 44a, 44b, 44c, 44d with their corresponding indentations 36 are especially useful when the container element forms a loop, which comprises an inner volume filled by gas, e.g. air, such as a bottom rim or a top rim.

If the container element is disc shaped, such as the bottom disc 115, the lid 121 or the sealing disc 127, the container element 115, 121, 127 may instead be placed into the transfer cavity 33 by gripping means such as one or more suction cups. In such case, the indentations 36 may be omitted. However, suction cups are not suitable when the container elements form a loop.

In the illustrated embodiment, there are four cavity portions 31 arranged in a row as seen in the first direction x. Each cavity portion 31 comprises a respective transfer cavity 33 and is arranged together with a corresponding respective cover portion 35.

The retaining device 23 is adapted to retain the container body 103 while the container element is being attached to the container body 103. The retaining device 23 comprises at least one through-going positioning cavity 37 with a second open area $A_2$ corresponding to the first open area $A_1$ of the transfer cavity 33, the positioning cavity 37 being adapted to receive a portion of the container body 103. If having a cover portion 35, the size and shape of the cover portion 35 of the transfer plate 29 is selected, such that the cover portion 35 is able to cover, or at least substantially cover, the second open area $A_2$ of the positioning cavity 37.

The supporting device 25 is adapted to support the container body 103 and to position the container body 103 in the retaining device 23.

The positioning unit 27 is adapted to position the container element 115, 117, 121, 123, 127 in the container body 103. Hence, the positioning unit 27 is aligned with the positioning cavity 37 as seen in a vertical direction z. The positioning unit 27 is vertically adjustable and capable of inserting the container element into the container body 103 to the desired preselectable attachment position. As described in more detail below, the positioning unit 27 may be caused to expand in a radial direction of the positioning cavity 37 and to press a vertical portion of the container element, cf. the edge portions 116, 129, 131, 133, 135 of FIG. 3, circumferentially in a direction towards a wall of the positioning cavity 37, i.e. to press against an inside of the container wall 105 of the container body 103 placed in the positioning cavity 37.

In the illustrated embodiment of the attachment unit 5, the transfer plate 29 comprises four cavity portions 31 arranged in a row as seen in the first direction x. In a corresponding way, the retaining device 23 comprises the same number of positioning cavities 37, i.e. four. Further, the supporting device 25 is adapted to support the same number of container bodies 103, i.e. four, and to position the portions of them in the respective positioning cavities 37 of the retaining device 23. In addition, the attachment unit 5 comprises the same number of positioning units 27, i.e. four, aligned with the positioning cavities 37, such that each positioning unit 27 is associated with a respective positioning cavity 37. With this configuration, it is possible to attach a number of container elements simultaneously, here four at the same time. Similar as for the transfer plate 29, the positioning cavities 37 and the positioning units 25 are arranged in a row as seen in the first direction x.

The transfer plate 29 is displaceable between a first position and a second position. In the first position the transfer plate 29 is arranged to receive the container element in the transfer cavity 33 while the cover portion 35 covers or substantially covers the second open area $A_2$ of the positioning cavity 37, as illustrated in FIG. 4. Thereby, loss of protective gas through the positioning cavity 37 may be minimized, or preferably avoided.

In the second position, as shown in FIG. 5, the transfer cavity 33 is aligned with the positioning cavity 37 of the retaining device 23 and, hence, also with the positioning unit 27. The transfer plate 29 is initially located vertically between the positioning unit 27 and the positioning cavity 37 of the retaining device 23. From this position, the positioning unit 27 displaces the container element from the transfer cavity 33 in the transfer plate 29 into the container body 103 by downward movement in the z direction through the transfer cavity 33 and at least partly through the positioning cavity 37 of the retaining device 23. In the embodiment illustrated in FIGS. 4 and 5, the container element is constituted by the upper rim 123.

In order to attach the container element to the container body 103, the retaining device 23 may comprise a welding unit 39, preferably arranged around the positioning cavity 37. The welding unit 39 is adapted to weld the container element to the container body 103, e.g. by the welding unit 39 comprising a coil extending around the positioning cavity 37. As the positioning unit 27 may be caused to expand in a radial direction of the positioning cavity 37 as set out herein, the container element can be pressed against the welding unit 39. Any suitable welding technique may be used, such as ultrasonic welding or high frequency welding, with high frequency welding being preferred.

As an alternative or a complement to welding, an adhesive may be applied to the container element before attaching it to the container body.

Figure 7:
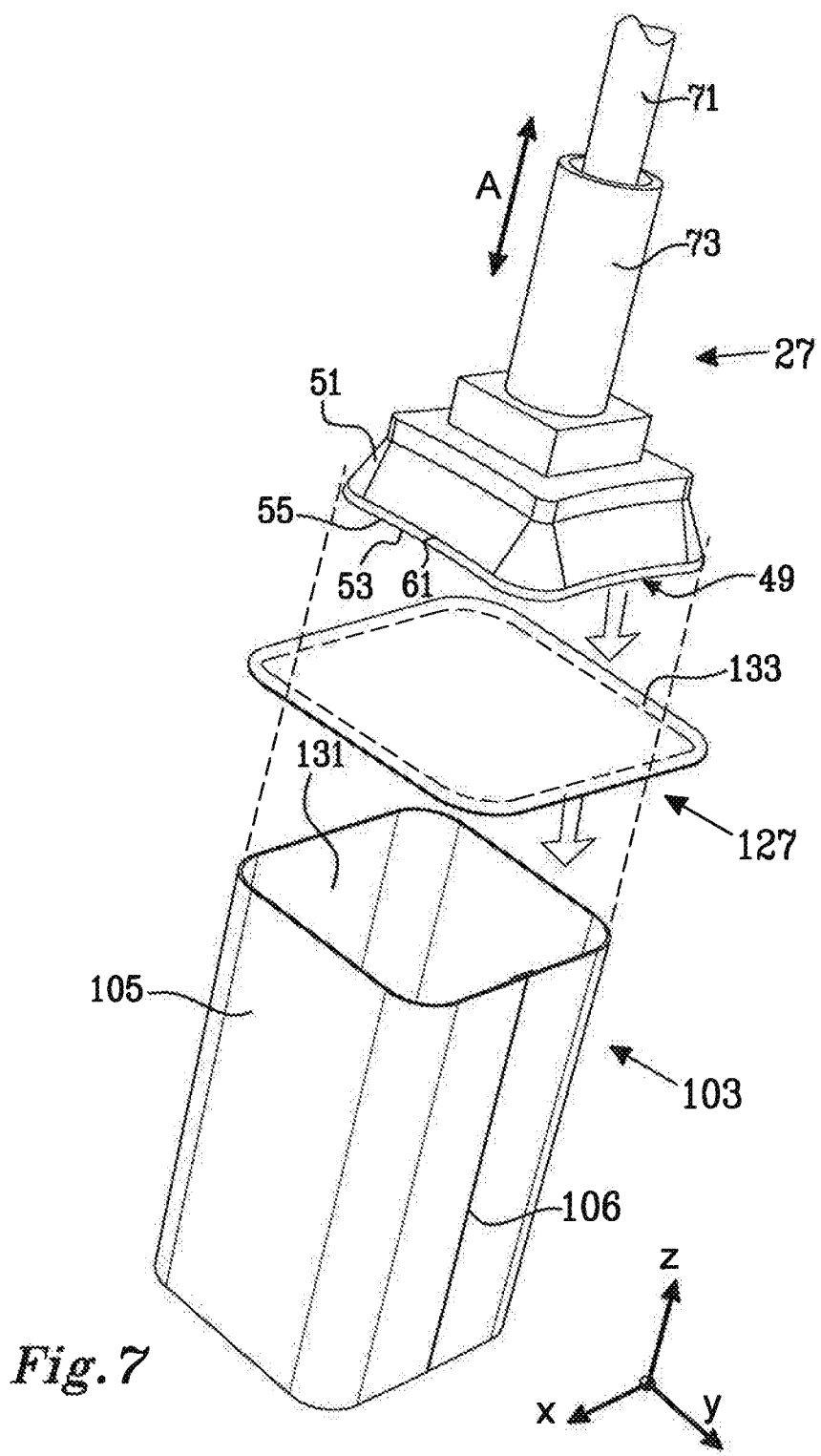
FIG. 7 shows a positioning unit according to the invention, a sealing disc and a container body.

FIG. 7 illustrates a positioning unit 27 according to the invention. The positioning unit may e.g. be one of the positioning units 27 of the attachment unit 5 illustrated in FIGS. 4 and 5. FIG. 7 further illustrates a sealing disc 127 in the process of being placed in a container body 103. As can be gleaned from FIG. 7, the sealing disc 127 has a larger cross-sectional area than the inner cross-sectional area of the container body 103. When placed in the container body 103, an edge portion 133 of the sealing disc 127 will be folded upwards, such that it conforms to an inside of the container wall 105. See also FIG. 3. The illustrated sealing disc 127 is a flexible or at least foldable member, such as a laminate of plastic film and aluminium foil, a plastic film, a paper sheet, a paper/plastic laminate, or the like. Container elements such as inner sealing discs, and bottom discs may alternatively be pre-formed with a sealable edge portion extending perpendicular to a main plane of the of the container element. In such case, no folding of the edge portion takes place when inserting the container element into the container body.

The sealing disc 127 is arranged as a transport seal inside a lid at an opening end of the packaging container, and is arranged to be fully or partially removed by a user in order to gain a first access to the packaged contents in the container. To this end, the sealing disc 127 may be provided with means for facilitating removal such as a pull-tab, a tear-strip, etc.

The positioning unit 27 comprises a base plate 49 comprising or being constituted by a rigid material such as metal or a composite material, and a plunger skirt 51 comprising a resiliently deformable material, e.g. rubber or plastics. The plunger skirt 51 is located on top of the base plate 49, such that it at least partly covers an upper surface 54 of the base plate 49 which upper surface 54 is opposite a lower footprint surface 53 of the base plate 49.

The footprint surface 53 is configured to face towards the container element, here a sealing disc 127 during application of the container element in the container body 103. The footprint surface 53 of the base plate 49 has a circumferential edge 55 which in the illustrated example has a substantially polygonal shape. However, it is to be understood that the footprint surface may have any other suitable shape adapted to the cross-sectional shape of the packaging container which is being produced. In the illustrated example, the substantially polygonal shape is a substantially square shape which comprises four side edge portions 55a, 55b, 55c, 55d which are connected by outwardly rounded corner portions 57a, 57b, 57c, 57d. See FIG. 8. In the illustrated embodiment, each side edge portion 55a, 55b, 55c, 55d comprises an inwardly curved segment 59a, 59b, 59c, 59d. The curved segment deviates from a straight line, which an ideal polygon shape would have, as indicated at the side edge portion 55b with the inwardly curved segment 59b in FIG. 8. The corner portions 57a, 57b, 57c, 57d are rounded to conform to the contour of the container body 103, which has been made by bending paperboard web material into a tubular shape. The circumferential edge 55 of the footprint surface 53 of the base plate 49 with curved segments deviates from the cross-sectional shape (footprint) of the produced packaging container at the one or more curved segments of the circumferential edge 55 of the footprint surface 53. In a corresponding prior art positioning unit as shown in FIG. 9, the base plate 49 has the same footprint as that of the container body 103, with straight side edge portions between curved corner portions.

Figure 12A:
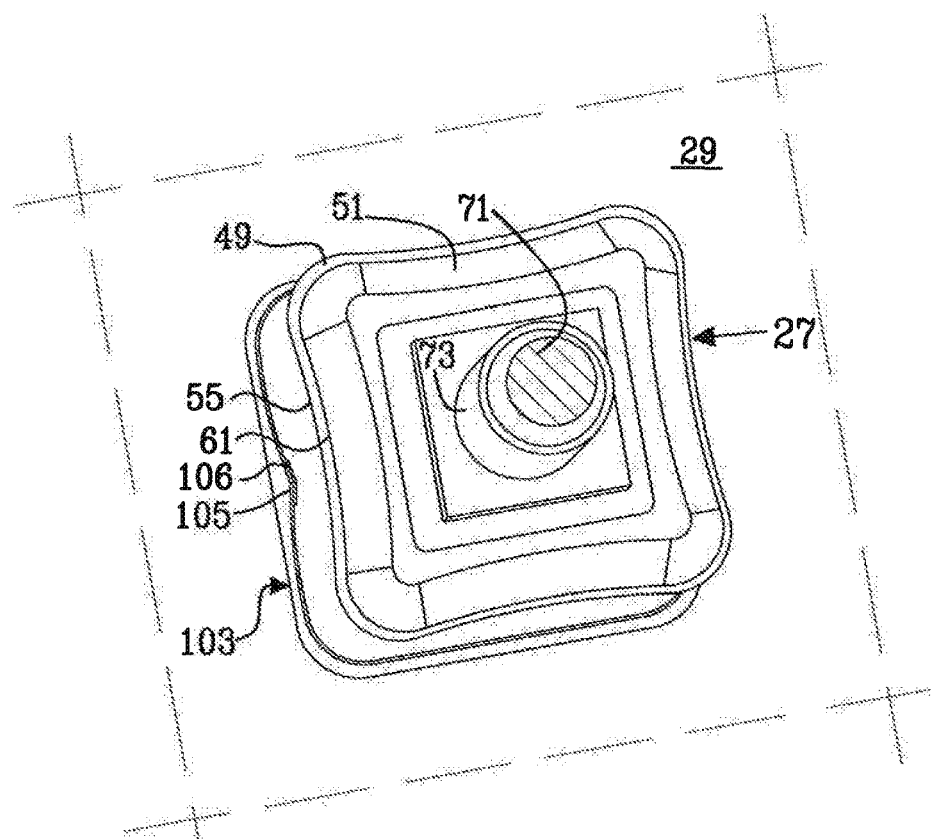
FIG. 12a shows the positioning unit with the plunger skirt in the unexpanded state.

In some instances, it may suffice with only one side comprising a curved segment. When only a single curved segment is arranged at the circumferential edge 55 of the footprint surface 53 of the base plate 49, the curved segment is preferably positioned at a location corresponding to a join 106 in the container body 103 as shown in FIG. 7. The join results from forming the container body 103 by bending the paperboard web material into a tubular shape and longitudinally closing the tube by joining overlapping or abutting side edges of the sheet material. The join between the side edges may be covered by a sealing strip. The join 106 makes the wall of the container board locally thicker and also constitutes a bending line where the container wall tends to bend inwards towards the interior of the container board as indicated in FIG. 12a. Due to the provision of a curved segment in a side edge portion of the circumferential edge of the footprint surface of the base plate, the base plate can pass such a potentially inwardly bent join 106 without damaging it when the positioning unit 27 inserts the container element 127 into the container body 103 to the desired attachment position in the container body 103.

However, by having two sides with a respective curved segment, the positioning unit 27 may be turned 180 degrees to even out wear. When the positioning unit 27 has a generally square shape, it is advantageous with four equal side edge portions having a respective curved segment, such that the positioning unit 27 can be turned in steps of 90 degrees. Moreover, the risk of damaging other portions of the container wall 105 apart from the join may be considerably reduced or avoided by means of the curved segments 59a, 59b, 59c, 59d.

The curved segments 59a, 59b, 59c, 59d are inwardly curved in a direction towards a centre $C_1$ of the footprint surface 53. Thereby, a minimum distance $d_r$ from the circumferential edge 55 of the footprint surface 53 of the base plate 49 to the centre $C_1$ of the footprint surface 53 is less than for a corresponding footprint surface 53 having a substantially polygonal shape with straight side edge portions. The ideal straight side edge portion is marked by a dashed line at the side edge portion 55b at the bottom of FIG. 8 and has a minimum distance $d_i$ from the theoretical ideal straight side edge portion to the centre $C_1$ of the footprint surface 53 of the base plate 49, wherein $d_i$ is greater than $d_r$, e.g. at least 1 mm greater, such as at least 2 mm greater, at least 4 mm greater or at least 8 mm greater.

Figure 10:
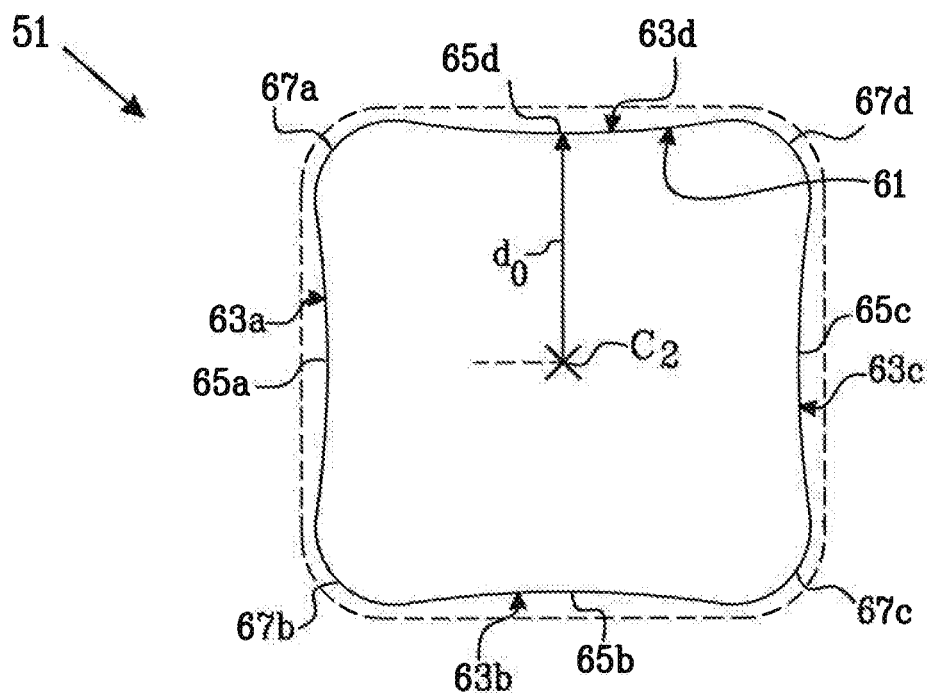
FIG. 10 shows an outer circumference of a plunger skirt comprised in the positioning unit in an unexpanded state.

The plunger skirt 51 is transformable between an unexpanded state, see FIG. 10, and an expanded state, see FIG.

Figure 11:
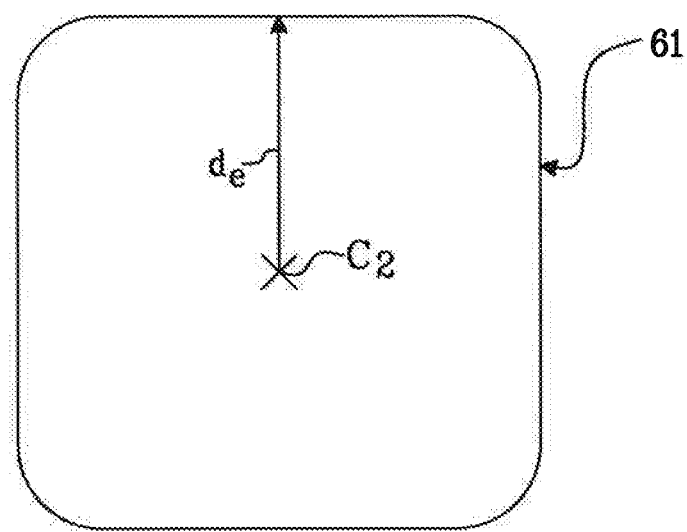
FIG. 11 shows the outer circumference of the plunger skirt of FIG. 10 in an expanded state.

11, by relative movement in relation to the base plate 49. FIGS. 10 and 11 show an outer circumference 61 of the plunger skirt 51.

Figure 8:
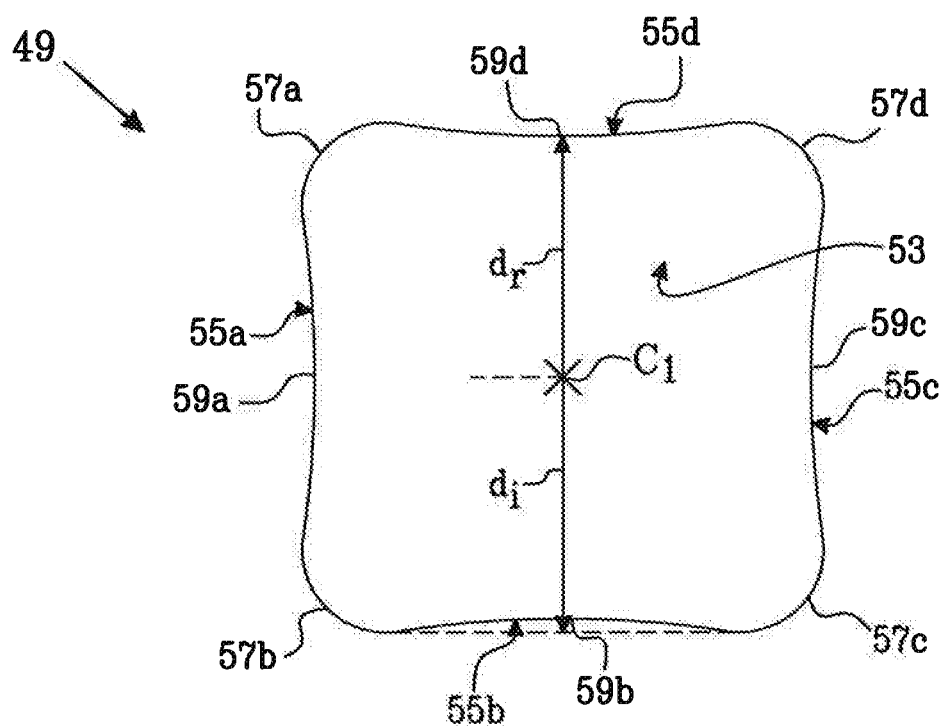
FIG. 8 shows a footprint surface of a base plate comprised in the positioning unit.
Figure 9:
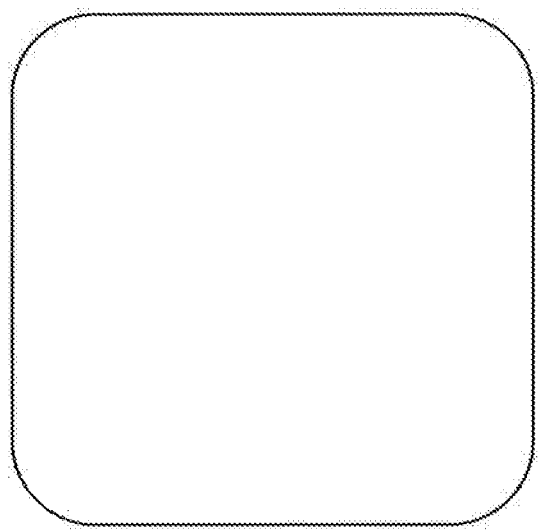
FIG. 9 shows a footprint surface of a base plate according to prior art.

In the unexpanded state of the plunger skirt 51, the shape of the outer contour of the plunger skirt 51 as shown in FIG. 10 corresponds to that of the base plate 49 shown in FIG. 8. Hence, in the unexpanded state, the plunger skirt 51 has the same substantially polygonal shape (footprint) as the base plate 49.

As is shown in FIG. 12a, when seen in relation to the base plate 49, the outer circumference 61 of the plunger skirt 51 is located at the circumferential edge 55 of the base plate 49, such as within 3 mm from the circumferential edge 55 of the footprint surface 53 of the base plate 49, within 2 mm from the circumferential edge 55 of the footprint surface of the base plate 49 or within 1 mm from the circumferential edge 55 of the footprint surface 53 of the base plate 49. Preferably, the outer circumference 61 of the plunger skirt 51 coincides with the circumferential edge 55 of the footprint surface 53 of the base plate 49 or is located somewhat inside the circumferential edge 55 of the footprint surface 53 of the base plate 49 when the plunger skirt 51 is in the unexpanded state as shown in FIGS. 10 and 12a. In correspondence with the shape of the circumferential edge 55 of the footprint surface 53 of the base plate 49, the outer circumference 61 of the plunger skirt 51 has at least one side edge portion comprising a curved segment, which is curved in a direction towards a centre $C_2$ of the outer circumference 61 of the plunger skirt 51. In the illustrated embodiment, there are four side portions 63a, 63b, 63c, 63d each having a respective curved segment 65a, 65b, 65c, 65d. The plunger skirt 51 further comprises four rounded corner portions 67a, 67b, 67c, 67d corresponding to the corner portions 57a, 57b, 57c, 57d of the base plate 49. There is a minimum distance $d_o$ from the outer circumference 61 of the plunger skirt 51 to the centre $C_2$ of the polygonal shape in the unexpanded state as indicated in FIG. 10.

Figure 12B:
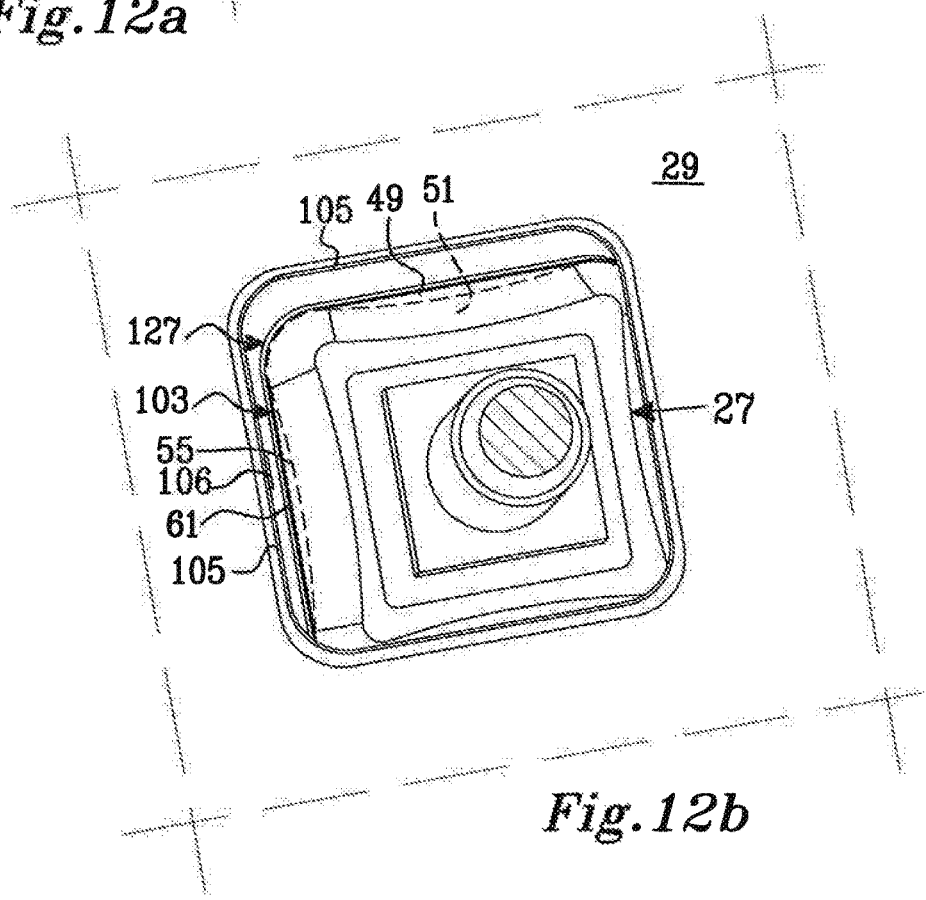
FIG. 12b shows the positioning unit with the plunger skirt in the expanded state
Figure 13A:
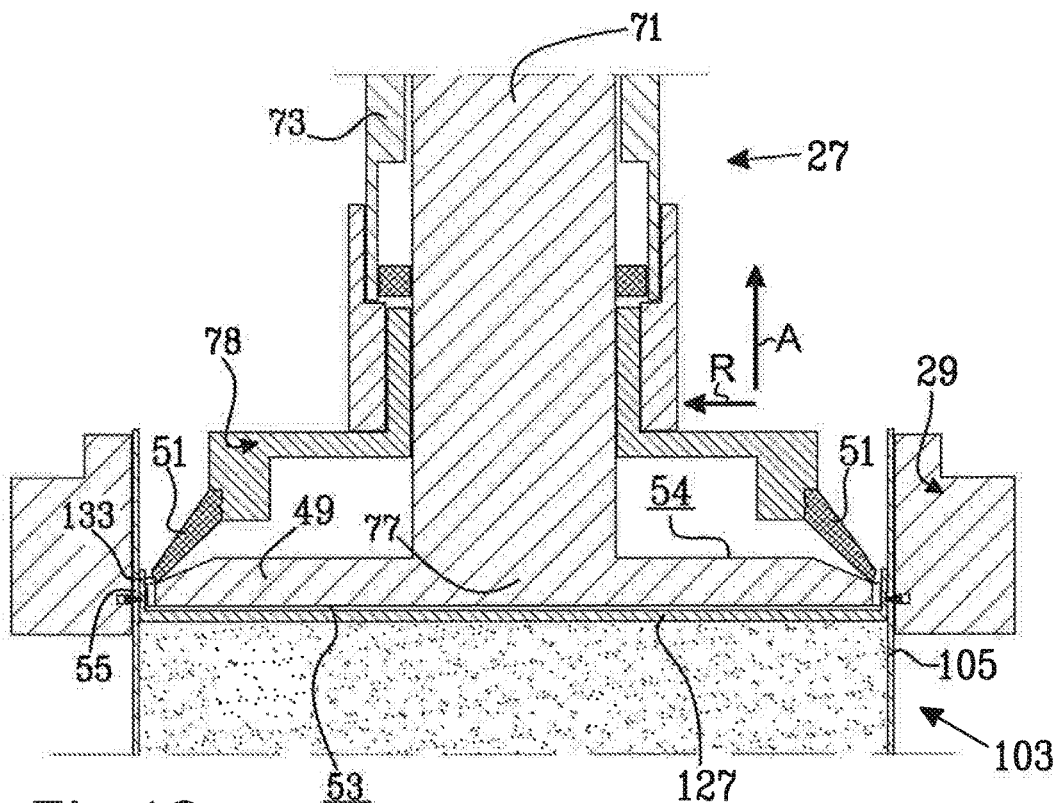
FIG. 13a shows a cross-section through a positioning unit with the plunger skirt in the unexpanded state.
Figure 13B:
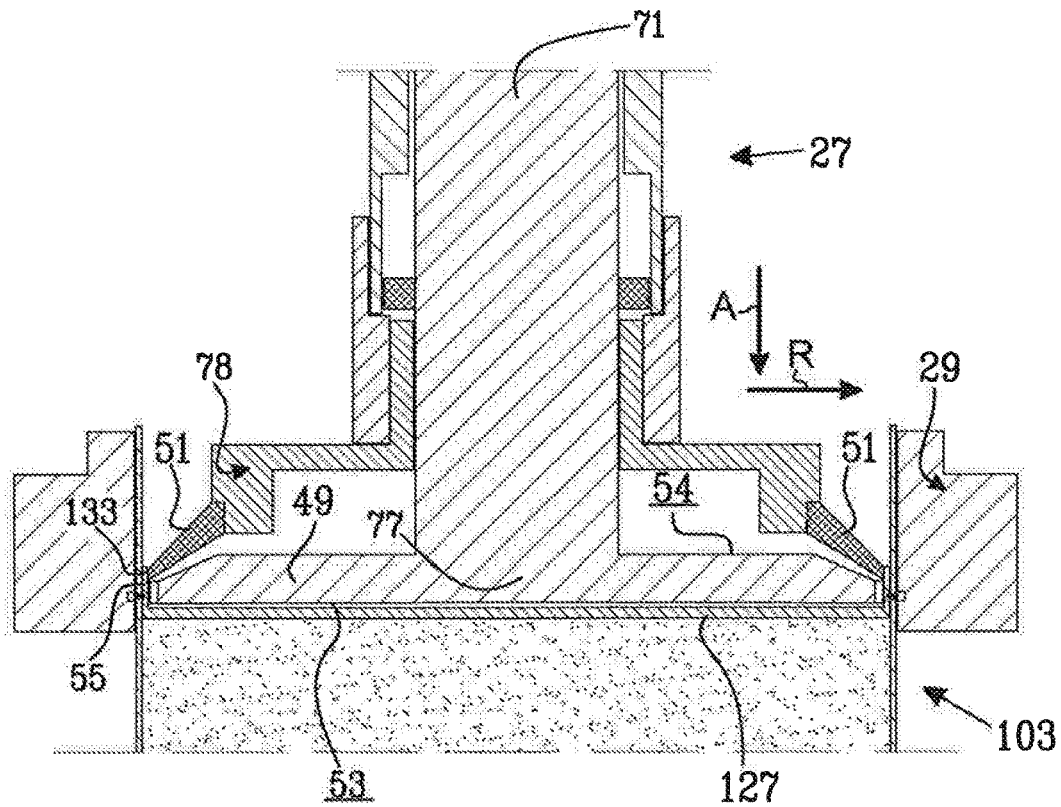
FIG. 13b shows a cross-section through a positioning unit with the plunger skirt in the expanded state.

In the expanded state, see FIG. 11, 12b and FIG. 13b, a cross-sectional area (footprint) delimited by the outer circumference 61 of the plunger skirt 51 is larger than in the unexpanded state of the plunger skirt 51. The outer circumference 61 of the plunger skirt 51 is indicated by dashed lines in FIG. 10. In the expanded state, there is a minimum distance $d_e$ from the outer circumference 61 of the plunger skirt 51 to the centre $C_2$ of the footprint of the plunger skirt 51, which is greater than the minimum distance $d_o$ of the unexpanded state, at least 1 mm greater, such as at least 2 mm greater, at least 4 mm greater or at least 8 mm greater. Thereby, the curvature of the curved segment is less in the expanded state than in the unexpanded state of the plunger skirt 51. Preferably the curvature is obliterated in the expanded state, such that the side edge portions 63a, 63b, 63c, 63d form straight lines or even such that they are imparted with a slightly outward curvature.

During transformation to the expanded state, pressure is applied to the plunger skirt 51 from above, in a manner explained below. Thereby, the geometry of the plunger skirt 51 will tend to straighten out its curved segments 65a, 65b, 65c, 65d. Hence, by carefully selecting the shape and material properties of the plunger skirt 51, the desired change of shape during transformation may be obtained.

In the expanded state as shown in FIGS. 11, 12b and 13b, the outer circumference 61 of the plunger skirt 51 is located at least partly outside of the circumferential edge 51 of the base plate 49. See FIG. 13b which illustrates the application of a container element exemplified by a sealing disc 127. In this state, the plunger skirt 51 is expanded radially from the position shown in FIG. 13a until the outer circumference of the plunger skirt 51 reaches outside the circumferential edge 55 of the footprint surface 53 of the base plate 49. It then contacts an edge portion 133 of the sealing disc 127 and presses the edge portion 133 of the sealing disc 127 against the inside of the container wall 105 as is shown in FIG. 13b. If the above-described holding elements 34 are used in the transfer plate 29, the plunger skirt 51 can contribute to press the container element back in an radial direction in case the container element does not spring back sufficiently itself.

Going back again to FIG. 7, it may be gleaned that there is a first piston 71 and a second piston 73 being coaxial with the first piston 71. The pistons 71, 73 extend in an axial direction A coinciding with the vertical direction z of the attachment unit 5, see FIGS. 4 and 5. The base plate 49 is attached to an end portion of the first piston 71, such that the footprint surface 53 is perpendicular to the axial direction A. The plunger skirt 51 is attached to an end portion of the second piston 73. The first and second pistons 71, 73 are configured to be axially displaceable in synchrony with each other as well as independently of each other.

During displacement of the positioning unit 27 to the preselectable attachment position of the container element 127, the plunger skirt 51 remains in the unexpanded state. See FIG. 12a. When the container element 127 has reached the preselectable attachment position and the plunger skirt 51 is to press in a radial direction on the edge portion of the container element 127, the plunger skirt 51 is transformed to the expanded state as shown in FIG. 12b. Thereby the end portion of the second piston 73 is moved closer to the end portion of the first piston 71 pressing the plunger skirt 51 outwards. This relative movement between the pistons in the axial direction A may be in the range of 1-15 mm, preferably 3-10 mm.

With reference to FIGS. 13a and 13b, the plunger skirt 51 is transferred to the expanded state by means of a relative displacement between the first piston 71 and the second piston 72, wherein the end portion 78 of the second piston 72 is moved closer to the end portion 77 of the first piston 71. When the outer ends 77, 78 of the first and the second pistons 71, 72 are brought together in this manner, the end portion 78 of the second piston 72 to which the plunger skirt 51 is attached e.g. by fusion or adhesively, is moved towards the base plate 49 and exerts pressure on the plunger skirt 51 which is located between the end portion 78 of the second piston 72 and the base plate 49. The pressure on the resiliently deformable plunger skirt 51 causes the dimension of the plunger skirt 51 in the axial direction A to diminish at the same time as the outer circumference 61 of the plunger skirt 51 expands outwardly in the radial direction R by sliding on the upper surface 54 of the base plate 49 which is opposite the footprint surface 53. Accordingly, the shape of the plunger skirt 51 changes under the influence of the compressive force acting in the axial direction A between the end portion 78 of the second piston 72 and the base plate 49 at the end portion 77 of the first piston 71.

In the expanded state of the plunger skirt 51 as shown in FIG. 13b, an edge portion of the outer circumference of the plunger skirt 51 contacts an edge portion of the container element which is inserted into the container and exerts pressure on the edge portion such that it is pressed against the inside of the container wall. In the example in FIGS. 13a and 13b, the container element is illustrated by a sealing disc 127 having an upwardly folded edge portion 133. It is to be understood that the positioning unit may be used for inserting and positioning any container element as disclosed herein, including a bottom disc, a rim, or a pre-formed bottom disc or sealing disc.

The outer circumference of the plunger skirt presses the container element against an inside of the container wall of the container body 103 which is placed in the positioning cavity. The edge portion of the outer circumference of the plunger skirt 51 which in the expanded state of the plunger skirt 51 is arranged to be in contact with and exert pressure on the container element, may have a contact surface which in the non-expanded state of the plunger skirt is slightly tilted with respect to the vertical direction of the positioning unit.

When applying pressure to the plunger skirt 51 in order to change the shape of the plunger skirt 51 from the unexpanded state to the expanded state, the corner portions 67a, 67b, 67c, 67d of the plunger skirt 51 generally move outwardly a shorter distance than the side portions 63a, 63b, 63c, 63d between the corner portions 67a, 67b, 67c, 67d. By way of example, when the side portions 63a, 63b, 63c, 63d move outwardly in the order of 4 mm, the corner portions 67a, 67b, 67c, 67d may move outwardly only half that distance, i.e. in the order of 2 mm.

In order to further improve contact between the container element and the container body material in the corner portions, thickened corner portions may be arranged on the upper surface of the base plate, i.e. on the surface opposite the footprint surface of the base plate. The thickened corner portions which form raised areas on the upper surface of the base plate serve to force the plunger skirt to move further out, thereby exerting an increased pressure on the applied container element and improving contact between the container element and the container body. Thereby a join formed between the container element and the corner portions of the container body may be improved. In particular, an increased pressure in the corner portions of the container body may aid in creating a tight seal between the container body material and a sheet form container element. Excess material present at the corner portions of sheet form container elements such as a bottom disc or a sealing disc will generally wrinkle at the corners of the container as the container element is folded and aligned with the container body wall. In such case, an increased pressure created at the corner portions of the container body would compress the wrinkles and would contribute to the formation of a good functional bond, such as a thermo-weld between the container body material and the sheet material in the container element. When using a thermo-welding process for bonding the container element to the wall of the container body, at least one of the container element and the container wall and preferably both comprise a thermoplastic material in a sufficient amount to create a functional bond. As set out herein, bonding of the container element to the container body may alternatively be performed by means of adhesive or by combinations of welding and adhesive.

The retaining device may comprise a lining (not shown in the figures) located in the positioning cavity and being arranged to shield an exposed edge of a container body. The lining is preferably applied such that it encircles the positioning cavity, thereby locally reducing a cross-sectional area of the positioning cavity. The lining may have a thickness in the same order as a thickness of a sheet material used for the container body and may be in the range of from 0.2 to 2 mm, such as from 0.5 to 1.5 mm or from 0.6 to 0.9 mm. This will e.g. be helpful when folding an edge portion of a sealing disc or a bottom plate.

A method of positioning a container element 115, 117, 121, 123, 127 in a container body 103 by means of a positioning unit as described herein may comprise moving the container element to a preselectable position in the container body 103 by means of the positioning unit 27 inserting the container element into the container body 103, the plunger skirt 51 thereby being in the unexpanded state, when the container element reaches the preselectable position, transforming the plunger skirt 51 to the expanded state, thereby pressing an edge portion 116, 129, 131, 135 of the container element in a direction towards an inner wall of the container body 103.

As described above, the step of transforming the plunger skirt 51 to the expanded state may be performed by means of relative displacement between the first piston 71 and second piston 73 as disclosed herein, wherein the end portion of the second piston 73 is moved closer to the end portion of the first piston 72.

The method may further comprise
fixing the container element 115, 117, 121, 123, 127 to the container body 103, e.g. by means of welding and/or an adhesive If the attachment unit 5 comprises a transfer plate 29, the method may comprise placing the container element 115, 117, 121, 123, 127 in the transfer cavity 33, displacing the transfer plate 29 to the second position, displacing the container element from the transfer cavity 33 in the transfer plate 29 into the container body 103 by means of the positioning unit 27 by moving through the transfer cavity 33 and at least partly through the positioning cavity 37 of the retaining device 23.

If the attachment unit 5 comprises a plurality of positioning units 27, the method may comprise that a plurality of container elements 115, 117, 121, 123, 127 are simultaneously positioned into said respective container bodies 103 by said positioning units 27.

The container element may be placed in the transfer cavity 33 of the transfer plate 29 by means of an optional container element supplier 41 comprising at least one gripping unit 42. A pile of container elements, e.g. bottom rims 117, may be stored in a magazine 43. The number of piles in the magazine 43 and the number of gripping units 42 correspond to the number of transfer cavities 33 in the transfer plate 29, in the illustrated case four piles. The gripping unit 42 is able to grip a single container element, here the bottom rim 117, move it from an opening 45 in the magazine 43 and place it in the corresponding transfer cavity 33. As an example, four single container elements are gripped at the same time. The gripping unit 42 comprises four gripping members 44a, 44b, 44c, 44d, which grip at the corners of the container element. The positions of the gripping members 44a, 44b, 44c, 44d correspond to the positions of the indentations 36 of the transfer plate 29. As mentioned above, such gripping members 44a, 44b, 44c, 44d with their corresponding indentations 36 are especially useful when the container element is not a sheet form element such as a bottom disc or a sealing disc, but instead forms a loop, such as a rim.

As an option, the attachment unit 5 may comprise an internal housing 47, as indicated by point-dashed lines in FIGS. 4 and 5. The internal housing 47 is located inside the external housing 7 and is arranged to provide an additional protective gas atmosphere above the positioning cavity 37 of the retaining device 23.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A positioning unit for positioning a container element in a container body, said positioning unit comprising:
    a base plate, comprising or consisting of a rigid material, and
    a resiliently deformable plunger skirt,
    said base plate having a footprint surface with a circumferential edge, comprising a plurality of side edge portions connected by corner portions,
    said plunger skirt covering a surface of said base plate opposite said footprint surface,
    wherein at least one of said side edge portions of said circumferential edge of said base plate comprises a curved segment, which is curved in an inward direction from said circumferential edge of said footprint surface,
    said plunger skirt is transformable between an unexpanded state and an expanded state,
    said plunger skirt having an outer circumference, which in said unexpanded state is located at said circumferential edge of said footprint surface of said base plate, and in said expanded state is located at least partly outside of said circumferential edge of said footprint surface of said base plate,
    said outer circumference of said plunger skirt in said unexpanded state having a shape corresponding to a shape of said circumferential edge of said footprint surface with at least one side portion of said outer circumference of said plunger skirt comprising a curved segment, which is curved in an inward direction from said outer circumference of said plunger skirt, said positioning unit further comprising a first piston and a second piston, said first piston and said second piston extending in an axial direction (A) with said second piston being coaxial with said first piston,
    said base plate being connected to an end portion of said first piston, such that said footprint surface of said base plate is perpendicular to said axial direction (A),
    said plunger skirt being connected to an end portion of said second piston,
    said first piston and said second piston being configured to be axially displaceable in synchrony with each other as well as independently of each other, and wherein said end portion of said second piston is configured to be closer to said end portion of said first piston when said plunger skirt is in said expanded state as compared to said unexpanded state.

2. The positioning unit according to claim 1, wherein at least two of said plurality of side edge portions of said circumferential edge of said footprint surface of said base plate comprise a respective curved segment.

3. The positioning unit according to claim 1, wherein in said expanded state of said plunger skirt a curvature of said curved segment of said side portion of said outer circumference of said plunger skirt is changed such that said curved segment is less curved in said inward direction in said expanded state of said plunger skirt or is straight in said expanded state of said plunger skirt or is curved in an outward direction in said expanded state of said plunger skirt.

4. The positioning unit according to claim 1, wherein said curved segment of said side edge portion of said circumferential edge of said footprint surface of said base plate extends from a corner portion to an adjacent corner portion of said circumferential edge of said footprint surface of said base plate.

5. The positioning unit according to claim 1, wherein said outer circumference of plunger skirt has a polygonal shape a minimum distance ($d_c$) from said outer circumference of said plunger skirt to a centre ($C_2$) of said polygonal shape of said plunger skirt in said expanded state is greater than a minimum distance ($d_o$) from said outer circumference of said plunger skirt to said centre ($C_2$) in said unexpanded state.

6. The positioning unit according to claim 1, said base plate having an extension in a height direction (z) being perpendicular to said footprint surface, wherein said extension in said height direction (z) is greater at a rounded corner than at an adjacent curved segment of said at least one side edge portion.

7. An attachment unit for attaching a container element to a container body, said attachment unit comprising:
    a retaining device, adapted to retain said container body while said container element is being attached to said container body,
    said positioning unit according to claim 1,
    said retaining device comprising at least one through-going positioning cavity being adapted to receive a portion of said container body,
    said positioning unit being aligned with said positioning cavity, such that said container element is displaceable by means of said positioning unit into said container body by moving said container element at least partly through said positioning cavity of said retaining device.

8. The attachment unit according to claim 7, wherein said retaining device comprises a lining located in said positioning cavity, thereby locally reducing a cross-sectional area of said positioning cavity, said lining having a thickness in the range of from 0.2 to 2 mm.

9. The attachment unit according to claim 8, wherein said retaining device comprises a welding unit, arranged around said positioning cavity, said welding unit being adapted to weld said container element to said container body, said welding unit comprising a coil extending around said positioning cavity.

10. The attachment unit according to claim 7, wherein said attachment unit further comprises a transfer plate for transferring said container element between a first position and a second position,
    said transfer plate comprising at least one through-going transfer cavity adapted to receive and hold said container element,
    said transfer plate being displaceable between said first position, in which said transfer plate is adapted to receive said container element in said transfer cavity, and said second position in which said transfer cavity is aligned with said positioning cavity of said retaining device,
    said transfer plate in said second position being located between said positioning unit and said positioning cavity of said retaining device, such that said container element is displaceable by means of said positioning unit from said transfer cavity in said transfer plate into said container body by moving said container element through said transfer cavity and at least partly through said positioning cavity of said retaining device.

11. The attachment unit according to claim 10, wherein said through-going transfer cavity of said transfer plate has a smaller cross-sectional area ($A_1$) than said positioning cavity of said retaining device.

12. The attachment unit according to claim 10, wherein said transfer plate comprises one or more holding elements adapted to hold said container element in said transfer cavity, said holding element being located at a centre of a side a wall of said transfer cavity.

13. The attachment unit according to claim 7, wherein said retaining device comprises a plurality of positioning cavities and said attachment unit comprises a plurality of positioning units according to any one of claims 1-7 aligned with said positioning cavities, such that each positioning unit is associated with a respective positioning cavity, said positioning cavities and said positioning units being arranged in a row.

14. The attachment unit according to claim 13, wherein said plurality of positioning units are adapted to simultaneously position said plurality of container elements in said respective container bodies.

15. An apparatus for attaching container elements to container bodies in a flow of containers, said apparatus comprising
a transport means configured to transport said flow of containers through said apparatus,
at least one attachment unit according to claim 8 arranged along said transport means.

16. A method of positioning a container element in a container body by means of a positioning unit according to claim 1, said method comprising
moving said container element in said axial direction (A) to a preselectable position within said container body (103) by means of said positioning unit, with said plunger skirt in said unexpanded state,
when said container element reaches said preselectable position, transforming said plunger skirt to said expanded state, thereby pressing an edge portion of said container element in a direction towards an inner wall of said container body, wherein transforming said plunger skirt to said expanded state is performed by means of relative displacement between said first piston and said second piston, wherein said end portion of said second piston is moved closer to said end portion of said first piston during said transformation from said unexpanded state to said expanded state.

17. The method according to claim 16 further comprising
fixing said container element to said container body by means of welding and/or an adhesive.

18. The method according to claim 16 when being performed by an attachment unit according to claim 10,
placing said container element in said transfer cavity,
displacing said transfer plate to said second position,
displacing said container element from said transfer cavity in said transfer plate into said container body by means of said positioning unit by moving through said transfer cavity and at least partly through said positioning cavity of said retaining device.

19. The method according to claim 16, performed by means of an attachment unit according to claim 13, wherein said plurality of container elements are simultaneously positioned into said respective container bodies by said positioning units.

* * * * *